United States Patent
Laroche et al.

(10) Patent No.: US 12,170,790 B2
(45) Date of Patent: Dec. 17, 2024

(54) VIDEO CODING AND DECODING

(71) Applicant: CANON KABUSHIKI KAISHA, Tokyo (JP)

(72) Inventors: Guillaume Laroche, Saint Aubin d'Aubigné (FR); Christophe Gisquet, Acigne (FR); Patrice Onno, Rennes (FR); Jonathan Taquet, Talensac (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/171,181

(22) Filed: Feb. 17, 2023

(65) Prior Publication Data

US 2023/0283802 A1 Sep. 7, 2023

Related U.S. Application Data

(63) Continuation of application No. 17/277,229, filed as application No. PCT/EP2019/075224 on Sep. 19, 2019, now Pat. No. 11,601,671.

(30) Foreign Application Priority Data

Sep. 21, 2018 (GB) ...................................... 1815443
Sep. 24, 2018 (GB) ...................................... 1815564

(51) Int. Cl.
  *H04N 19/56* (2014.01)
  *H04N 19/13* (2014.01)
  *H04N 19/184* (2014.01)

(52) U.S. Cl.
  CPC ............. *H04N 19/56* (2014.11); *H04N 19/13* (2014.11); *H04N 19/184* (2014.11)

(58) Field of Classification Search
  CPC ....... H04N 19/56; H04N 19/13; H04N 19/184
  See application file for complete search history.

(56) References Cited

U.S. PATENT DOCUMENTS

2013/0083853 A1   4/2013   Coban
2018/0048889 A1   2/2018   Zhang
(Continued)

FOREIGN PATENT DOCUMENTS

AU   2015272007 A1   1/2016
CA      2971880 A1   8/2016
(Continued)

OTHER PUBLICATIONS

Li Haihua Zhang Baoju, Explore the new generation of video coding standard H.264, School of Physics and Electronic Information, Tianjin Normal University, 2008.
(Continued)

*Primary Examiner* — Tracy Y. Li
(74) *Attorney, Agent, or Firm* — Canon U.S.A., Inc. IP Division

(57) ABSTRACT

A method of encoding a motion vector predictor index, in particular a Merge index, comprises generating a list of motion vector predictor candidates, in particular merge candidates. The list includes an ATMVP candidate. One of the motion vector predictor candidates in the list is selected. A motion vector predictor index for the selected motion vector predictor candidate is generated using CABAC coding. One or more bits of the motion vector predictor index are bypass CABAC coded. For example, only the first bit of the motion vector predictor index is CABAC coded using a single context.

22 Claims, 22 Drawing Sheets

(56) References Cited

U.S. PATENT DOCUMENTS

| | | |
|---|---|---|
| 2018/0070100 A1 | 3/2018 | Chen et al. |
| 2018/0070110 A1 | 3/2018 | Chuang |
| 2018/0091816 A1 | 3/2018 | Chien |
| 2018/0098087 A1 | 4/2018 | Li et al. |
| 2018/0270500 A1 | 9/2018 | Li et al. |
| 2019/0028731 A1 | 1/2019 | Chuang |
| 2019/0110064 A1 | 4/2019 | Zhang et al. |
| 2019/0200040 A1* | 6/2019 | Lim ................... H04N 19/51 |
| 2019/0208211 A1 | 7/2019 | Zhang et al. |
| 2019/0222834 A1 | 7/2019 | Chen et al. |
| 2019/0335191 A1 | 10/2019 | Kondo |
| 2020/0007889 A1 | 1/2020 | Chao |
| 2021/0058637 A1 | 2/2021 | Zhang et al. |
| 2021/0092366 A1 | 3/2021 | Liu et al. |
| 2021/0195198 A1 | 6/2021 | Chen |

FOREIGN PATENT DOCUMENTS

| | | | |
|---|---|---|---|
| CN | 103152562 A | 6/2013 | |
| CN | 104205830 A | 12/2014 | |
| CN | 104349164 A | 2/2015 | |
| CN | 106537915 A | 3/2017 | |
| CN | 106851304 A | 6/2017 | |
| CN | 107113446 A | 8/2017 | |
| CN | 107493474 A | 12/2017 | |
| CN | 108432250 A | 8/2018 | |
| CN | 109792531 A | 5/2019 | |
| CN | 110546952 A * | 12/2019 | ........... H04N 19/122 |
| EP | 3331243 A1 | 6/2018 | |
| EP | 3468195 A1 | 4/2019 | |
| EP | 3854094 A1 | 7/2021 | |
| GB | 2563936 A | 1/2019 | |
| KR | 10-2018-0037583 A | 4/2018 | |
| TW | 201404161 A * | 1/2014 | ........... H04N 19/103 |
| TW | 201640893 A | 11/2016 | |
| TW | 201813404 A | 4/2018 | |
| WO | 2013/018369 A1 | 2/2013 | |
| WO | WO-2015101640 A1 * | 7/2015 | ........... H04N 19/119 |
| WO | 2017/148345 A1 | 9/2017 | |
| WO | 2017/200771 A1 | 11/2017 | |
| WO | 2018/052986 A1 | 3/2018 | |
| WO | 2018/064524 A1 | 4/2018 | |

OTHER PUBLICATIONS

Feng Zou, et al., EE4: Improved affine motion prediction, Joint Video Exploration Team (JVET) of ITU-T SG 16 WP 3 and ISO/IEC JTC 1/SC 29/WG11, 4th Meeting, Chengdu, CN, Oct. 15-21, 2016, Doc. No. JVET-D0121.

Huang Han, et al., Research on Inter/Intra Prediction and Optimization Techniques in HEVC, China Academic Journal Electronic Publishing House, Dec. 2013, English abstract is on p. 8 of document.

Jianle Chen, et al., Algorithm Description of Joint Exploration Test Model 2, Joint Video Exploration Team (JVET) of ITU-T SG 16 WP 3 and ISO/IEC JTC 1/SC 29/WG 11, 2nd Meeting: San Diego, Feb. 20-26, 2016, Doc. No. JVET-B1001 v3.

Zhang Na, Research on High Efficiency Inter Coding in Video Compression, Dissertation for the Doctoral Degree in Engineering, Harbin Institute of Technology, 2017, China Academic Journal Electronic Publishing House, (English abstract is on p. 7).

Haitao Yang, et al., CE4: Summary report on inter prediction and motion vector coding, Joint Video Experts Team (JVET) of ITU-T SG 16 WP 3 and ISO/IEC JTC 1/SC 29/WG 11, 11th Meeting: Ljubljana, SI, Jul. 10-18, 2018, Doc. No. JVET-K0024-v1.

Guillame Laroche, et al., CE4-related: On Affine Mode Restriction, Joint Video Experts Team (JVET) of ITU-T SG 16 WP 3 and ISO/IEC JTC 1/SC 29/WG 11, 12th meeting, Macao, CN, Oct. 3-12, 2018, 6 pages, Doc. No. JVET-L0193, XP30190876.

Zhang Rui, et al., Advanced Technology and Optimisation for Video Coding H.264/AVC, Huazhong University of Science and Technology Wuhan, China Academic Journal Electronic Publishing House, 2005 (English Abstract on third page).

* cited by examiner

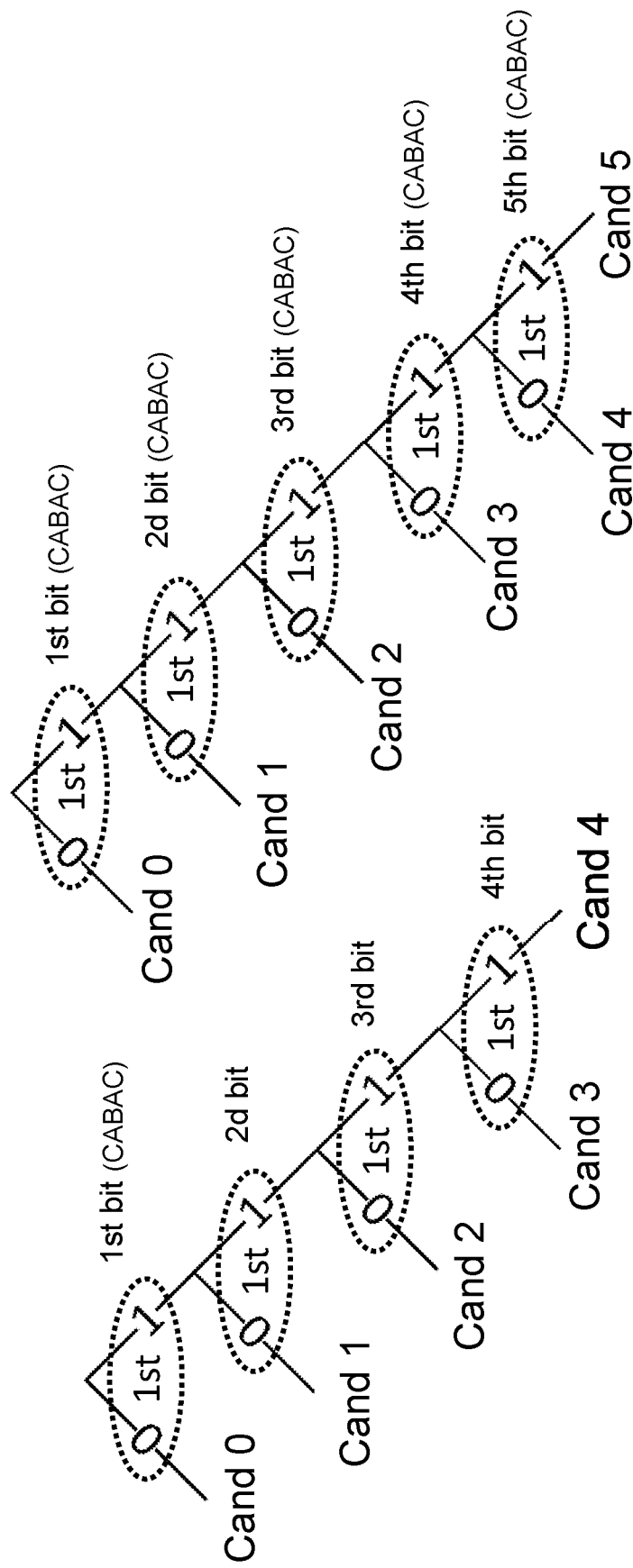

VIDEO CODING AND DECODING

CROSS-REFERENCE TO RELATED APPLICATIONS

This application is a continuation, and claims the benefit, of U.S. patent application Ser. No. 17/277,229, filed on Mar. 17, 2021, that is the National Phase application of PCT Application No. PCT/EP2019/075224, filed on Sep. 19, 2019 and titled "VIDEO CODING AND DECODING". This application claims the benefit under 35 U.S.C. § 119(a)-(d) of United Kingdom Patent Application No. 1815443.5, filed on Sep. 21, 2018 and United Kingdom Patent Application No. 1815564.8, filed on Sep. 24, 2018. The above cited patent applications are incorporated herein by reference in their entirety.

FIELD OF INVENTION

The present invention relates to video coding and decoding.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos.

In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools. A further tool not present in HEVC is to use an 'affine motion mode' when applying motion compensation. Motion compensation in HEVC is limited to translations, but in reality there are many kinds of motion, e.g. zoom in/out, rotation, perspective motions and other irregular motions. When utilising affine motion mode, a more complex transform is applied to a block to attempt to more accurately predict such forms of motion.

Another tool not present in HEVC is to use Alternative Temporal Motion Vector Prediction (ATMVP). The alternative temporal motion vector prediction (ATMVP) is a particular motion compensation. Instead of considering only one motion information for the current block from a temporal reference frame, each motion information of each collocated block is considered. So this temporal motion vector prediction gives a segmentation of the current block with the related motion information of each sub-block. In the current VTM reference software, ATMVP is signalled as a merge candidate inserted in the list of Merge candidates. When ATMVP is enabled at SPS level, the maximum number of Merge candidates is increased by one. So 6 candidates are considered instead of 5 when this mode is disabled.

These, and other tools described later, are bringing up problems relating to the coding efficiency and complexity of the coding of a Merge index used to signal which Merge candidate is selected from among the list of Merge candidates.

Accordingly, a solution to at least one of the aforementioned problems is desirable.

According to a first aspect of the present invention there is provided a method of encoding a motion vector predictor index, comprising:
generating a list of motion vector predictor candidates including an ATMVP candidate;
selecting one of the motion vector predictor candidates in the list; and
generating a motion vector predictor index (Merge index) for the selected motion vector predictor candidate using CABAC coding, one or more bits of the motion vector predictor index being bypass CABAC coded.

In one embodiment, all bits except for a first bit of the motion vector predictor index are bypass CABAC coded.

According to a second aspect of the present invention there is provided a method of decoding a motion vector predictor index, comprising:
generating a list of motion vector predictor candidates including an ATMVP candidate;
decoding the motion vector predictor index using CABAC decoding, one or more bits of the motion vector predictor index being bypass CABAC decoded; and
using the decoded motion vector predictor index to identify one of the motion vector predictor candidates in the list.

In one embodiment, all bits except for a first bit of the motion vector predictor index are bypass CABAC decoded.

According to a third aspect of the present invention there is provided a device for encoding a motion vector predictor index, comprising:
means for generating a list of motion vector predictor candidates including an ATMVP candidate;
means for selecting one of the motion vector predictor candidates in the list; and
means for generating a motion vector predictor index (Merge index) for the selected motion vector predictor candidate using CABAC coding, one or more bits of the motion vector predictor index being bypass CABAC coded.

According to a fourth aspect of the present invention there is provided a device for decoding a motion vector predictor index, comprising:
means for generating a list of motion vector predictor candidates including an ATMVP candidate;
means for decoding the motion vector predictor index using CABAC decoding, one or more bits of the motion vector predictor index being bypass CABAC decoded; and
means for using the decoded motion vector predictor index to identify one of the motion vector predictor candidates in the list.

According to a fifth aspect of the present invention there is provided a method of encoding a motion vector predictor index, comprising:
generating a list of motion vector predictor candidates;
selecting one of the motion vector predictor candidates in the list; and
generating a motion vector predictor index for the selected motion vector predictor candidate using CABAC coding, two or more bits of the motion vector predictor index sharing the same context.

In one embodiment, all bits of the motion vector predictor index share the same context.

According to a sixth aspect of the present invention there is provided a method of decoding a motion vector predictor index, comprising:
generating a list of motion vector predictor candidates;
decoding the motion vector predictor index using CABAC decoding, two or more bits of the motion vector predictor index sharing the same context; and
using the decoded motion vector predictor index to identify one of the motion vector predictor candidates in the list.

In one embodiment, all bits of the motion vector predictor index share the same context.

According to a seventh aspect of the present invention there is provided a device for encoding a motion vector predictor index, comprising:

means for generating a list of motion vector predictor candidates;
means for selecting one of the motion vector predictor candidates in the list; and
means for generating a motion vector predictor index for the selected motion vector predictor candidate using CABAC coding, two or more bits of the motion vector predictor index sharing the same context.

According to an eighth aspect of the present invention there is provided a device for decoding a motion vector predictor index, comprising:

means for generating a list of motion vector predictor candidates;
means for decoding the motion vector predictor index using CABAC decoding, two or more bits of the motion vector predictor index sharing the same context; and
means for using the decoded motion vector predictor index to identify one of the motion vector predictor candidates in the list.

According to a ninth aspect of the present invention there is provided a method of encoding a motion vector predictor index, comprising:

generating a list of motion vector predictor candidates;
selecting one of the motion vector predictor candidates in the list; and
generating a motion vector predictor index for the selected motion vector predictor candidate using CABAC coding, wherein a context variable for at least one bit of the motion vector predictor index of a current block depends on a motion vector predictor index of at least one block neighbouring the current block.

In one embodiment the context variable for at least one bit of the motion vector predictor index depends on the respective motion vector predictor indexes of at least two neighbouring blocks.

In another embodiment the context variable for at least one bit of the motion vector predictor index depends on a motion vector predictor index of a left neighbouring block on the left of the current block and on a motion vector predictor index of an upper neighbouring block above the current block.

In another embodiment the left neighbouring block is A2 and the upper neighbouring block is B3.

In another embodiment the left neighbouring block is A1 and the upper neighbouring block is B1.

In another embodiment the context variable has 3 different possible values.

Another embodiment comprises comparing the motion vector predictor index of at least one neighbouring block with an index value of the motion vector predictor index of the current block and setting said context variable in dependence upon the comparison result.

Another embodiment comprises comparing the motion vector predictor index of at least one neighbouring block with a parameter representing a bit position of the or one said bit in the motion vector predictor index of the current block and setting said context variable in dependence upon the comparison result.

Yet another embodiment comprises making a first comparison, comparing the motion vector predictor index of a first neighbouring block with a parameter representing a bit position of the or one said bit in the motion vector predictor index of the current block; making a second comparison, comparing the motion vector predictor index of a second neighbouring block with said parameter; and setting said context variable in dependence upon the results of the first and second comparisons.

According to a tenth aspect of the present invention there is provided a method of decoding a motion vector predictor index, comprising:

generating a list of motion vector predictor candidates;
decoding the motion vector predictor index using CABAC decoding, wherein a context variable for at least one bit of the motion vector predictor index of a current block depends on a motion vector predictor index of at least one block neighbouring the current block; and
using the decoded motion vector predictor index to identify one of the motion vector predictor candidates in the list.

In one embodiment the context variable for at least one bit of the motion vector predictor index depends on the respective motion vector predictor indexes of at least two neighbouring blocks.

In another embodiment the context variable for at least one bit of the motion vector predictor index depends on a motion vector predictor index of a left neighbouring block on the left of the current block and on a motion vector predictor index of an upper neighbouring block above the current block.

In another embodiment the left neighbouring block is A2 and the upper neighbouring block is B3.

In another embodiment the left neighbouring block is A1 and the upper neighbouring block is B1.

In another embodiment the context variable has 3 different possible values.

Another embodiment comprises comparing the motion vector predictor index of at least one neighbouring block with an index value of the motion vector predictor index of the current block and setting said context variable in dependence upon the comparison result.

Another embodiment comprises comparing the motion vector predictor index of at least one neighbouring block with a parameter representing a bit position of the or one said bit in the motion vector predictor index of the current block and setting said context variable in dependence upon the comparison result.

Yet another embodiment comprises making a first comparison, comparing the motion vector predictor index of a first neighbouring block with a parameter representing a bit position of the or one said bit in the motion vector predictor index of the current block; making a second comparison, comparing the motion vector predictor index of a second neighbouring block with said parameter; and setting said context variable in dependence upon the results of the first and second comparisons.

According to an eleventh aspect of the present invention there is provided a device for encoding a motion vector predictor index, comprising:
  means for generating a list of motion vector predictor candidates;
  means for selecting one of the motion vector predictor candidates in the list; and
  means for generating a motion vector predictor index for the selected motion vector predictor candidate using CABAC coding, wherein a context variable for at least one bit of the motion vector predictor index of a current block depends on a motion vector predictor index of at least one block neighbouring the current block.

According to a twelfth aspect of the present invention there is provided a device for decoding a motion vector predictor index, comprising:
  means for generating a list of motion vector predictor candidates;
  means for decoding the motion vector predictor index using CABAC decoding, wherein a context variable for at least one bit of the motion vector predictor index of a current block depends on a motion vector predictor index of at least one block neighbouring the current block; and
  means for using the decoded motion vector predictor index to identify one of the motion vector predictor candidates in the list.

According to a thirteenth aspect of the present invention there is provided a method of encoding a motion vector predictor index, comprising:
  generating a list of motion vector predictor candidates;
  selecting one of the motion vector predictor candidates in the list; and
  generating a motion vector predictor index for the selected motion vector predictor candidate using CABAC coding, wherein a context variable for at least one bit of the motion vector predictor index of a current block depends on a Skip flag of said current block.

According to a fourteenth aspect of the present invention there is provided a method of encoding a motion vector predictor index, comprising:
  generating a list of motion vector predictor candidates;
  selecting one of the motion vector predictor candidates in the list; and generating a motion vector predictor index for the selected motion vector predictor candidate using CABAC coding, wherein a context variable for at least one bit of the motion vector predictor index of a current block depends on another parameter or syntax element of said current block that is available prior to decoding of the motion vector predictor index.

According to a fifteenth aspect of the present invention there is provided a method of encoding a motion vector predictor index, comprising:
  generating a list of motion vector predictor candidates;
  selecting one of the motion vector predictor candidates in the list; and
  generating a motion vector predictor index for the selected motion vector predictor candidate using CABAC coding, wherein a context variable for at least one bit of the motion vector predictor index of a current block depends on another parameter or syntax element of said current block that is an indicator of a complexity of motion in the current block.

According to a sixteenth aspect of the present invention there is provided a method of decoding a motion vector predictor index, comprising:
  generating a list of motion vector predictor candidates;
  decoding the motion vector predictor index using CABAC decoding, wherein a context variable for at least one bit of the motion vector predictor index of a current block depends on a Skip flag of said current block; and
  using the decoded motion vector predictor index to identify one of the motion vector predictor candidates in the list.

According to a seventeenth aspect of the present invention there is provided a method of decoding a motion vector predictor index, comprising:
  generating a list of motion vector predictor candidates;
  decoding the motion vector predictor index using CABAC decoding, wherein a context variable for at least one bit of the motion vector predictor index of a current block depends on another parameter or syntax element of said current block that is available prior to decoding of the motion vector predictor index; and
  using the decoded motion vector predictor index to identify one of the motion vector predictor candidates in the list.

According to an eighteenth aspect of the present invention there is provided a method of decoding a motion vector predictor index, comprising:
  generating a list of motion vector predictor candidates;
  decoding the motion vector predictor index using CABAC decoding, wherein a context variable for at least one bit of the motion vector predictor index of a current block depends on another parameter or syntax element of said current block that is an indicator of a complexity of motion in the current block; and
  using the decoded motion vector predictor index to identify one of the motion vector predictor candidates in the list.

According to a nineteenth aspect of the present invention there is provided a device for encoding a motion vector predictor index, comprising:
  means for generating a list of motion vector predictor candidates;
  means for selecting one of the motion vector predictor candidates in the list; and
  means for generating a motion vector predictor index for the selected motion vector predictor candidate using CABAC coding, wherein a context variable for at least one bit of the motion vector predictor index of a current block depends on a Skip flag of said current block.

According to a twentieth aspect of the present invention there is provided a device for encoding a motion vector predictor index, comprising:
  means for generating a list of motion vector predictor candidates;
  means for selecting one of the motion vector predictor candidates in the list; and
  means for generating a motion vector predictor index for the selected motion vector predictor candidate using CABAC coding, wherein a context variable for at least one bit of the motion vector predictor index of a current block depends on another parameter or syntax element of said current block that is available prior to decoding of the motion vector predictor index.

According to a twenty-first aspect of the present invention there is provided a device for encoding a motion vector predictor index, comprising:

means for generating a list of motion vector predictor candidates;

means for selecting one of the motion vector predictor candidates in the list; and means for generating a motion vector predictor index for the selected motion vector predictor candidate using CABAC coding, wherein a context variable for at least one bit of the motion vector predictor index of a current block depends on another parameter or syntax element of said current block that is an indicator of a complexity of motion in the current block.

According to a twenty-second aspect of the present invention there is provided a device for decoding a motion vector predictor index, comprising:

means for generating a list of motion vector predictor candidates;

means for decoding the motion vector predictor index using CABAC decoding, wherein a context variable for at least one bit of the motion vector predictor index of a current block depends on a Skip flag of said current block; and means for using the decoded motion vector predictor index to identify one of the motion vector predictor candidates in the list.

According to a twenty-third aspect of the present invention there is provided a device for decoding a motion vector predictor index, comprising:

means for generating a list of motion vector predictor candidates;

means for decoding the motion vector predictor index using CABAC decoding, wherein a context variable for at least one bit of the motion vector predictor index of a current block depends on another parameter or syntax element of said current block that is available prior to decoding of the motion vector predictor index; and means for using the decoded motion vector predictor index to identify one of the motion vector predictor candidates in the list.

According to a twenty-fourth aspect of the present invention there is provided a device for decoding a motion vector predictor index, comprising:

means for generating a list of motion vector predictor candidates;

means for decoding the motion vector predictor index using CABAC decoding, wherein a context variable for at least one bit of the motion vector predictor index of a current block depends on another parameter or syntax element of said current block that is an indicator of a complexity of motion in the current block; and means for using the decoded motion vector predictor index to identify one of the motion vector predictor candidates in the list.

According to a twenty-fifth aspect of the present invention there is provided a method of encoding a motion vector predictor index, comprising:

generating a list of motion vector predictor candidates;

selecting one of the motion vector predictor candidates in the list; and generating a motion vector predictor index for the selected motion vector predictor candidate using CABAC coding, wherein a context variable for at least one bit of the motion vector predictor index of a current block depends on Affine Motion vector predictor candidates, if any, in the list.

In one embodiment the context variable depends on position in said list of a first Affine Motion vector predictor candidate.

According to a twenty-sixth aspect of the present invention there is provided a method of decoding a motion vector predictor index, comprising:

generating a list of motion vector predictor candidates;

decoding the motion vector predictor index using CABAC decoding wherein a context variable for at least one bit of the motion vector predictor index of a current block depends on Affine Motion vector predictor candidates, if any, in the list; and using the decoded motion vector predictor index to identify one of the motion vector predictor candidates in the list.

In one embodiment the context variable depends on position in said list of a first Affine Motion vector predictor candidate.

According to a twenty-seventh aspect of the present invention there is provided a device for encoding a motion vector predictor index, comprising:

means for generating a list of motion vector predictor candidates;

means for selecting one of the motion vector predictor candidates in the list; and means for generating a motion vector predictor index for the selected motion vector predictor candidate using CABAC coding, wherein a context variable for at least one bit of the motion vector predictor index of a current block depends on Affine Motion vector predictor candidates, if any, in the list.

According to a twenty-eighth aspect of the present invention there is provided a device for decoding a motion vector predictor index, comprising:

means for generating a list of motion vector predictor candidates;

means for decoding the motion vector predictor index using CABAC decoding wherein a context variable for at least one bit of the motion vector predictor index of a current block depends on Affine Motion vector predictor candidates, if any, in the list; and means for using the decoded motion vector predictor index to identify one of the motion vector predictor candidates in the list.

According to a twenty-ninth aspect of the present invention there is provided a method of encoding a motion vector predictor index, comprising:

generating a list of motion vector predictor candidates including an Affine Motion vector predictor candidate;

selecting one of the motion vector predictor candidates in the list; and generating a motion vector predictor index for the selected motion vector predictor candidate using CABAC coding, wherein a context variable for at least one bit of the motion vector predictor index of a current block depends on an affine flag of the current block and/or of at least one block neighbouring the current block.

According to a thirtieth aspect of the present invention there is provided a method of decoding a motion vector predictor index, comprising:

generating a list of motion vector predictor candidates including an Affine Motion vector predictor candidate;

decoding the motion vector predictor index using CABAC decoding, wherein a context variable for at least one bit of the motion vector predictor index of a current block depends on an affine flag of the current block and/or of at least one block neighbouring the current block; and using the decoded motion vector predictor index to identify one of the motion vector predictor candidates in the list.

According to a thirty-first aspect of the present invention there is provided a device for encoding a motion vector predictor index, comprising:
- means for generating a list of motion vector predictor candidates including an Affine Motion vector predictor candidate;
- means for selecting one of the motion vector predictor candidates in the list; and
- means for generating a motion vector predictor index for the selected motion vector predictor candidate using CABAC coding, wherein a context variable for at least one bit of the motion vector predictor index of a current block depends on an affine flag of the current block and/or of at least one block neighbouring the current block.

According to a thirty-second aspect of the present invention there is provided a device for decoding a motion vector predictor index, comprising:
- means for generating a list of motion vector predictor candidates including an Affine Motion vector predictor candidate;
- means for decoding the motion vector predictor index using CABAC decoding, wherein a context variable for at least one bit of the motion vector predictor index of a current block depends on an affine flag of the current block and/or of at least one block neighbouring the current block; and
- means for using the decoded motion vector predictor index to identify one of the motion vector predictor candidates in the list.

According to a thirty-third aspect of the present invention there is provided a method of encoding a motion vector predictor index, comprising:
- generating a list of motion vector predictor candidates;
- selecting one of the motion vector predictor candidates in the list; and
- generating a motion vector predictor index for the selected motion vector predictor candidate using CABAC coding, wherein a context variable for at least one bit of the motion vector predictor index of a current block is derived from a context variable of at least one of a Skip flag and an affine flag of the current block.

According to a thirty-fourth aspect of the present invention there is provided a method of decoding a motion vector predictor index, comprising:
- generating a list of motion vector predictor candidates;
- decoding the motion vector predictor index using CABAC decoding, wherein a context variable for at least one bit of the motion vector predictor index of a current block is derived from a context variable of at least one of a Skip flag and an affine flag of the current block; and
- using the decoded motion vector predictor index to identify one of the motion vector predictor candidates in the list.

According to a thirty-fifth aspect of the present invention there is provided a device for encoding a motion vector predictor index, comprising:
- means for generating a list of motion vector predictor candidates;
- means for selecting one of the motion vector predictor candidates in the list; and
- means for generating a motion vector predictor index for the selected motion vector predictor candidate using CABAC coding, wherein a context variable for at least one bit of the motion vector predictor index of a current block is derived from a context variable of at least one of a Skip flag and an affine flag of the current block.

According to a thirty-sixth aspect of the present invention there is provided a device for decoding a motion vector predictor index, comprising:
- means for generating a list of motion vector predictor candidates;
- means for decoding the motion vector predictor index using CABAC decoding, wherein a context variable for at least one bit of the motion vector predictor index of a current block is derived from a context variable of at least one of a Skip flag and an affine flag of the current block; and
- means for using the decoded motion vector predictor index to identify one of the motion vector predictor candidates in the list.

According to a thirty-seventh aspect of the present invention there is provided a method of encoding a motion vector predictor index, comprising:
- generating a list of motion vector predictor candidates;
- selecting one of the motion vector predictor candidates in the list; and
- generating a motion vector predictor index for the selected motion vector predictor candidate using CABAC coding, wherein a context variable for at least one bit of the motion vector predictor index of a current block has only two different possible values.

According to a thirty-eighth aspect of the present invention there is provided a method of decoding a motion vector predictor index, comprising:
- generating a list of motion vector predictor candidates;
- decoding the motion vector predictor index using CABAC decoding, wherein a context variable for at least one bit of the motion vector predictor index of a current block has only two different possible values; and
- using the decoded motion vector predictor index to identify one of the motion vector predictor candidates in the list.

According to a thirty-ninth aspect of the present invention there is provided a device for encoding a motion vector predictor index, comprising:
- means for generating a list of motion vector predictor candidates;
- means for selecting one of the motion vector predictor candidates in the list; and
- means for generating a motion vector predictor index for the selected motion vector predictor candidate using CABAC coding, wherein a context variable for at least one bit of the motion vector predictor index of a current block has only two different possible values.

According to a fortieth aspect of the present invention there is provided a device for decoding a motion vector predictor index, comprising:
- means for generating a list of motion vector predictor candidates;
- means for decoding the motion vector predictor index using CABAC decoding, wherein a context variable for at least one bit of the motion vector predictor index of a current block has only two different possible values; and
- means for using the decoded motion vector predictor index to identify one of the motion vector predictor candidates in the list.

According to a forty-first aspect of the present invention there is provided a method of encoding a motion vector predictor index, comprising:
generating a list of motion vector predictor candidates;
selecting one of the motion vector predictor candidates in the list; and
generating a motion vector predictor index for the selected motion vector predictor candidate using CABAC coding, wherein the motion vector predictor index of a current block depends on Affine Motion vector predictor candidates, if any, in the list.

In one embodiment the motion vector predictor index is a merge index.

According to a forty-second aspect of the present invention there is provided a method of decoding a motion vector predictor index, comprising:
generating a list of motion vector predictor candidates;
decoding the motion vector predictor index using CABAC decoding, wherein the motion vector predictor index of a current block depends on Affine Motion vector predictor candidates, if any, in the list; and
using the decoded motion vector predictor index to identify one of the motion vector predictor candidates in the list.

In one embodiment the motion vector predictor index is a merge index.

According to a forty-third aspect of the present invention there is provided a device for encoding a motion vector predictor index, comprising:
means for generating a list of motion vector predictor candidates;
means for selecting one of the motion vector predictor candidates in the list; and
means for generating a motion vector predictor index for the selected motion vector predictor candidate using CABAC coding, wherein the motion vector predictor index of a current block depends on Affine Motion vector predictor candidates, if any, in the list.

According to a forty-fourth aspect of the present invention there is provided a device for decoding a motion vector predictor index, comprising:
means for generating a list of motion vector predictor candidates;
means for decoding the motion vector predictor index using CABAC decoding, wherein the motion vector predictor index of a current block depends on Affine Motion vector predictor candidates, if any, in the list; and
means for using the decoded motion vector predictor index to identify one of the motion vector predictor candidates in the list.

According to a forty-fifth aspect of the present invention there is provided a method of encoding a motion vector predictor index, comprising:
generating a list of motion vector predictor candidates including an Affine Motion vector predictor candidate;
selecting one of the motion vector predictor candidates in the list; and
generating a motion vector predictor index for the selected motion vector predictor candidate using CABAC coding, wherein the motion vector predictor index of a current block depends on an affine flag of the current block and/or of at least one block neighbouring the current block.

In one embodiment the motion vector predictor index is a merge index.

According to a forty-sixth aspect of the present invention there is provided a method of decoding a motion vector predictor index, comprising:
generating a list of motion vector predictor candidates including an Affine Motion vector predictor candidate;
decoding the motion vector predictor index using CABAC decoding, wherein the motion vector predictor index of a current block depends on an affine flag of the current block and/or of at least one block neighbouring the current block; and
using the decoded motion vector predictor index to identify one of the motion vector predictor candidates in the list.

In one embodiment the motion vector predictor index is a merge index.

According to a forty-seventh aspect of the present invention there is provided a device for encoding a motion vector predictor index, comprising:
means for generating a list of motion vector predictor candidates including an Affine Motion vector predictor candidate;
means for selecting one of the motion vector predictor candidates in the list; and
means for generating a motion vector predictor index for the selected motion vector predictor candidate using CABAC coding, wherein the motion vector predictor index of a current block depends on an affine flag of the current block and/or of at least one block neighbouring the current block.

According to a forty-eighth aspect of the present invention there is provided a device for decoding a motion vector predictor index, comprising:
means for generating a list of motion vector predictor candidates including an Affine Motion vector predictor candidate;
means for decoding the motion vector predictor index using CABAC decoding, wherein the motion vector predictor index of a current block depends on an affine flag of the current block and/or of at least one block neighbouring the current block; and
means for using the decoded motion vector predictor index to identify one of the motion vector predictor candidates in the list.

Yet further aspects of the present invention relate to programs which when executed by a computer or processor cause the computer or processor to carry out any of the methods of the aforementioned aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present in invention relate to a camera comprising a device according to any of the aforementioned device aspects. In one embodiment the camera further comprises zooming means.

In one embodiment the camera is adapted to indicate when said zooming means is operational and signal affine mode in dependence on said indication that the zooming means is operational.

In another embodiment the camera further comprises panning means.

In another embodiment the camera is adapted to indicate when said panning means is operational and signal affine mode in dependence on said indication that the panning means is operational.

According to yet another aspect of the present invention there is provided a mobile device comprising a camera embodying any of the camera aspects above.

In one embodiment the mobile device further comprises at least one positional sensor adapted to sense a change in orientation of the mobile device.

In one embodiment the mobile device is adapted to signal affine mode in dependence on said sensing a change in orientation of the mobile device.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

Reference will now be made, by way of example, to the accompanying drawings, in which.

Figure 6A:
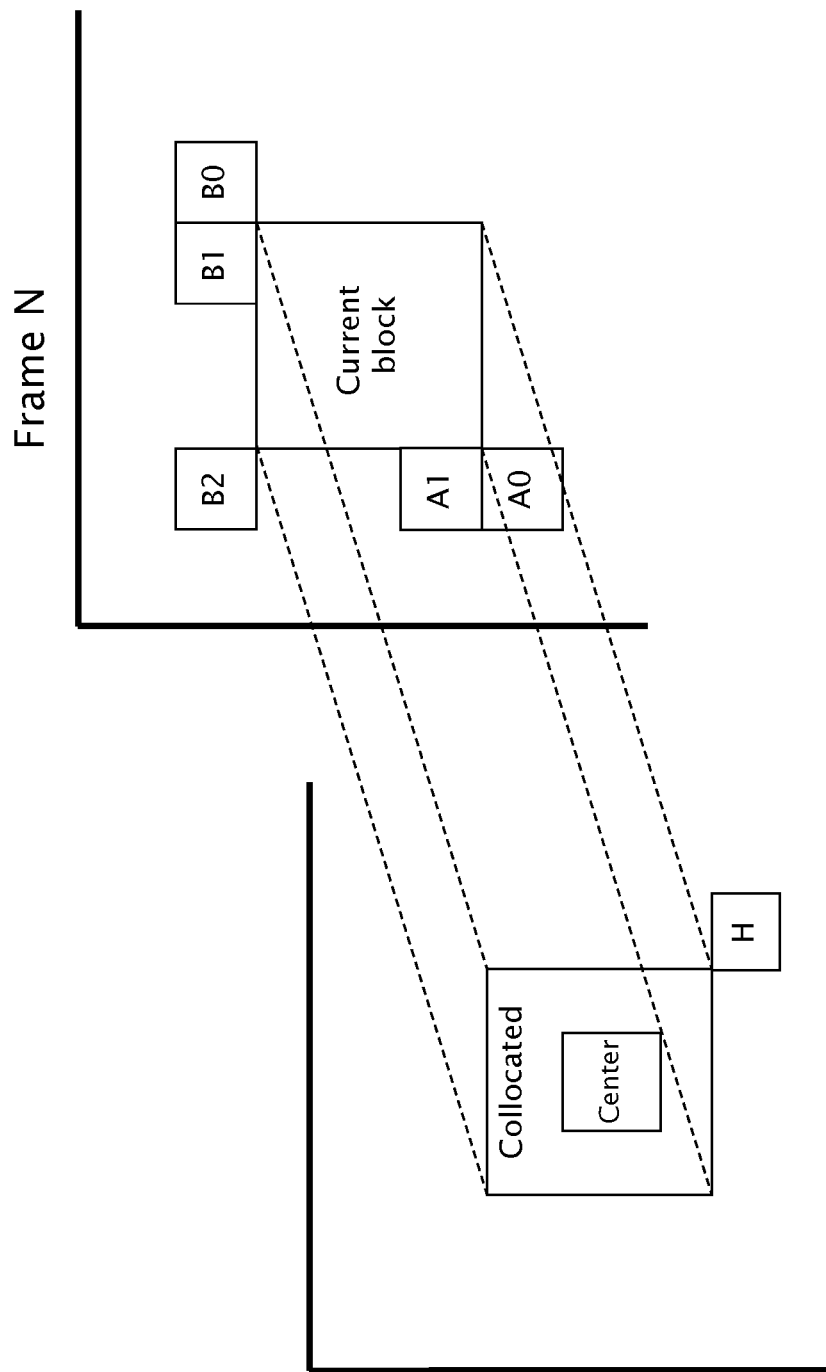
Figure 6B:
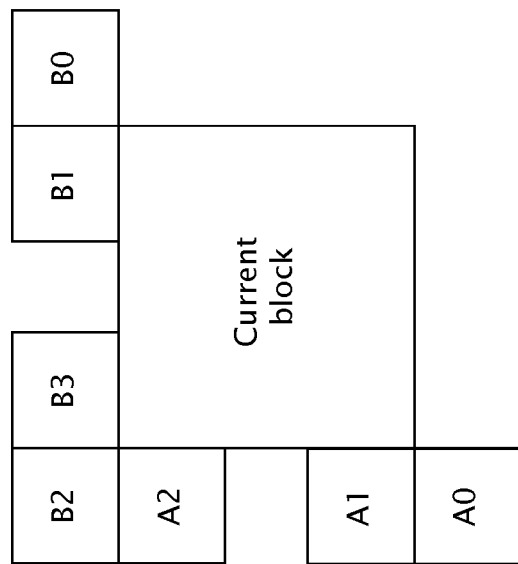
Figure 7:
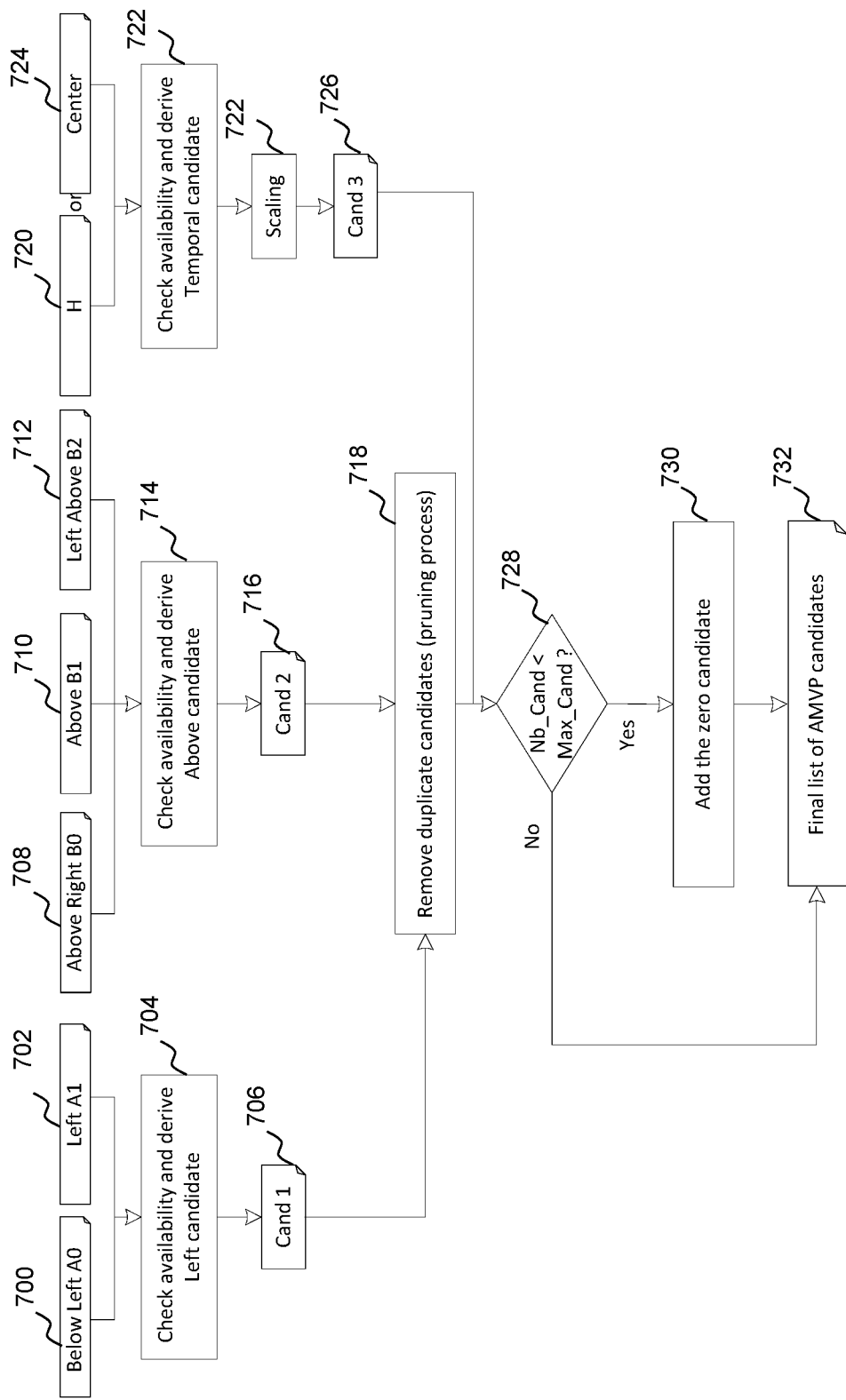
Figure 8:
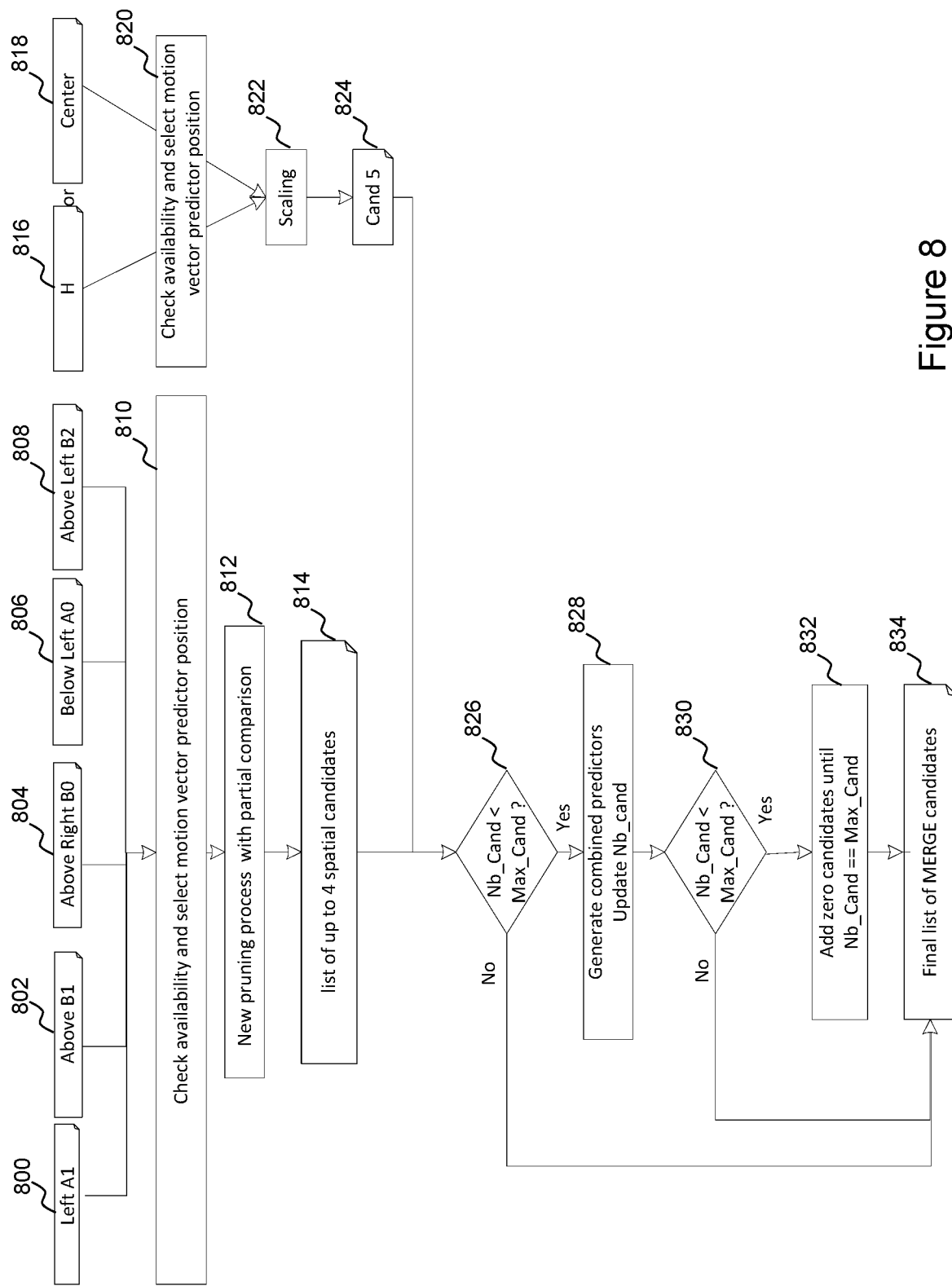
Figure 9:
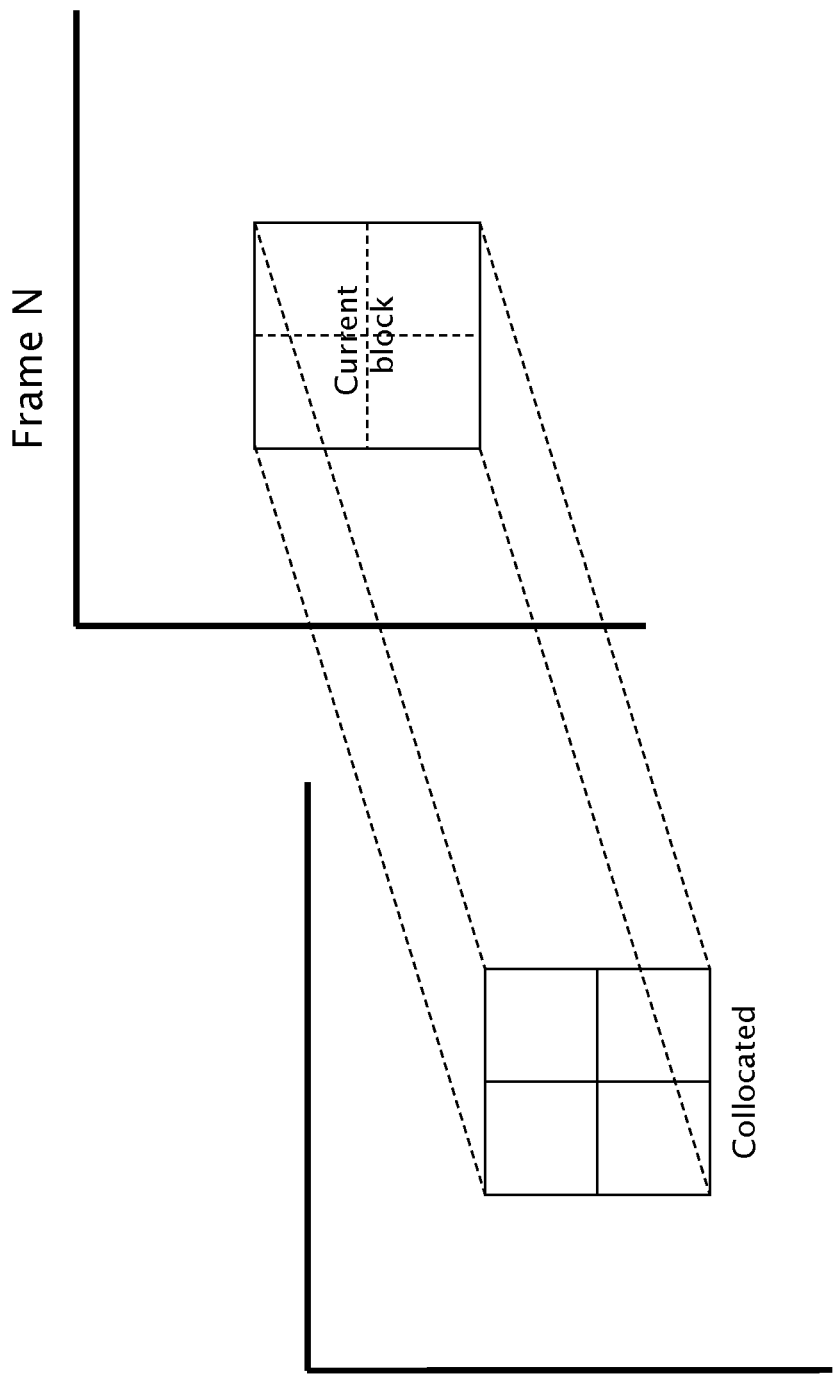
Figure 11B:
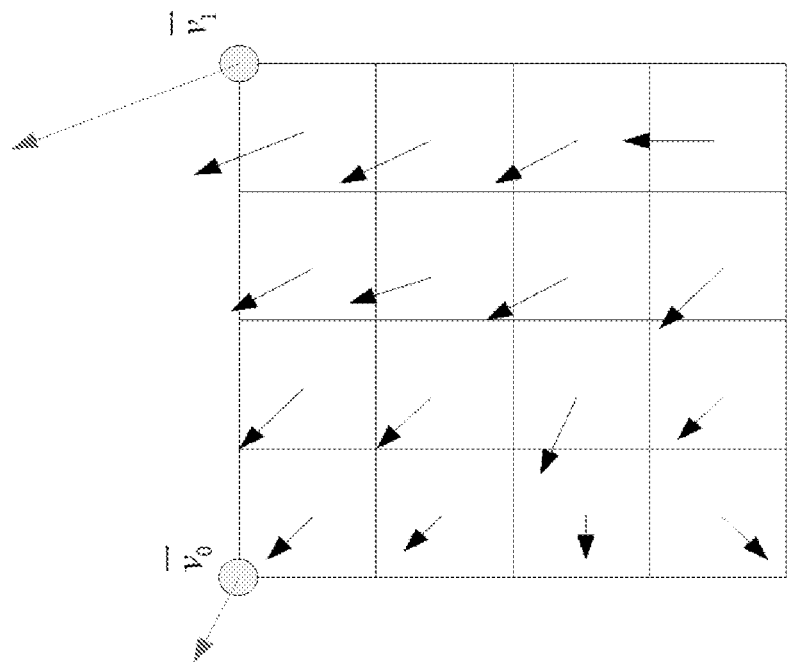
Figure 11A:
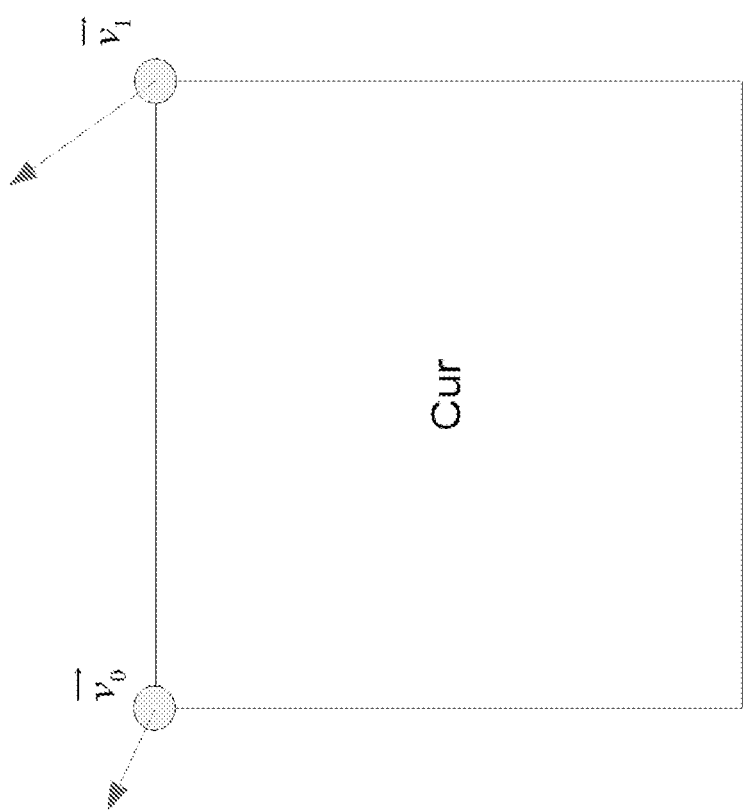
Figure 12:
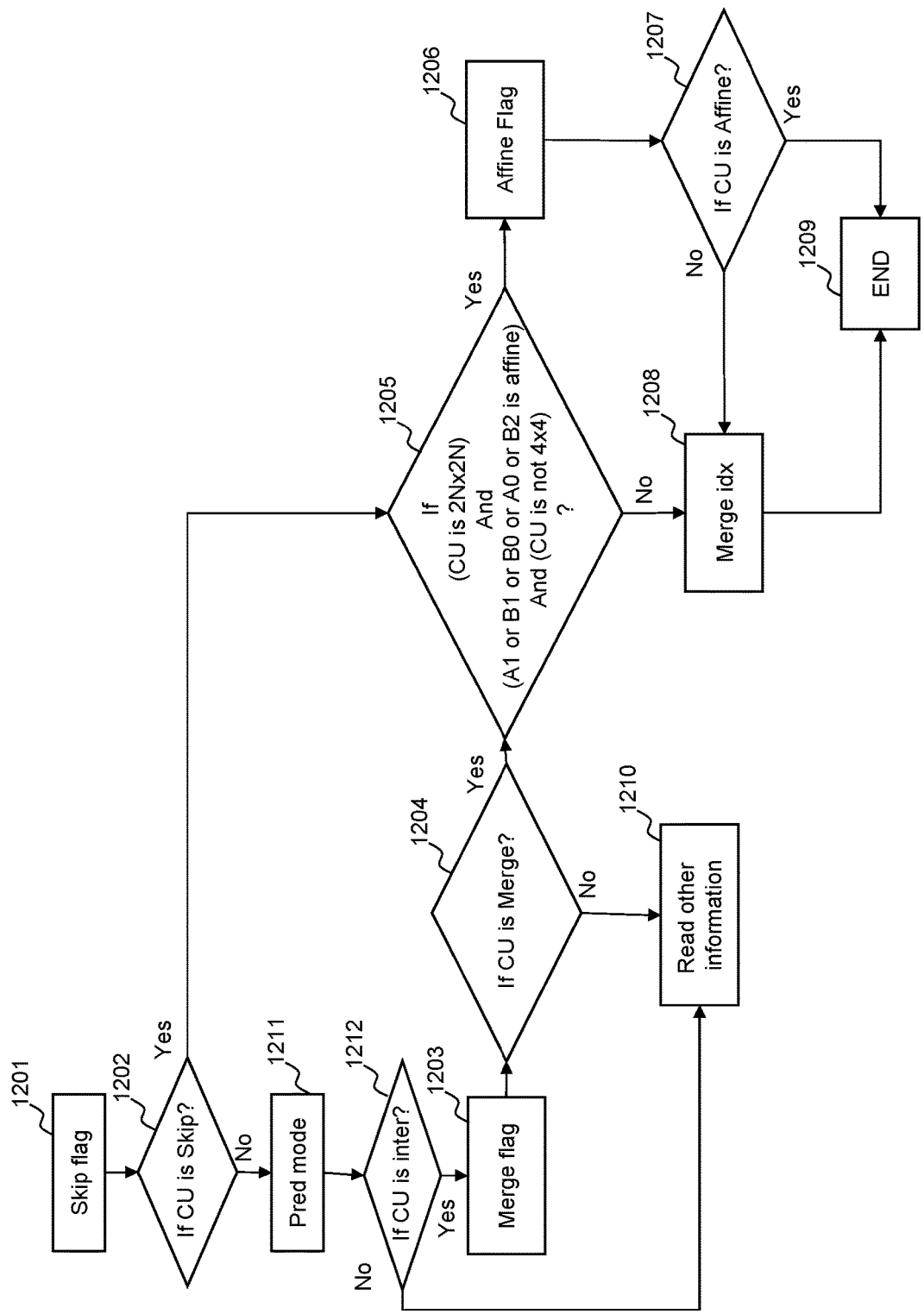
Figure 13:
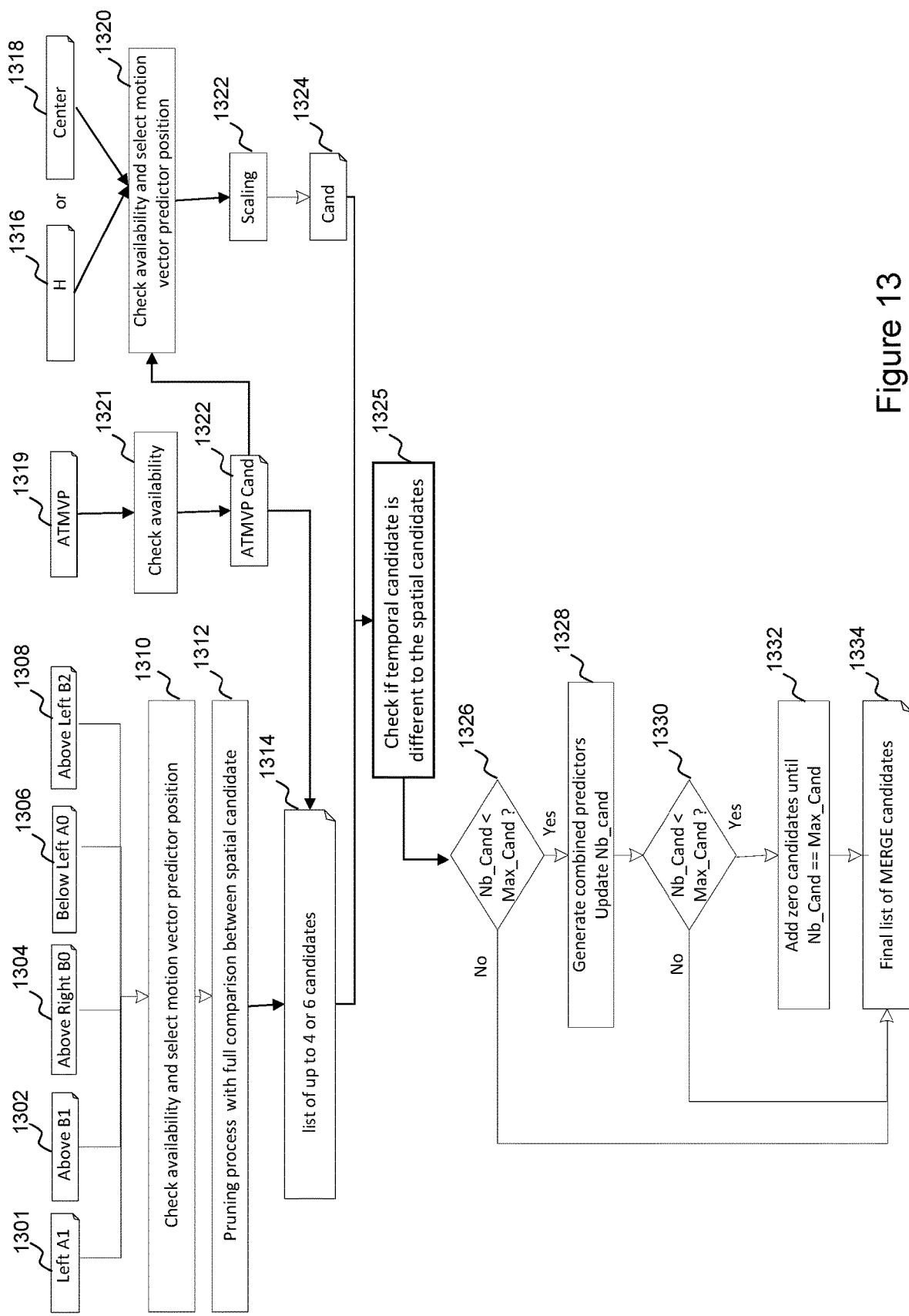
Figure 14:
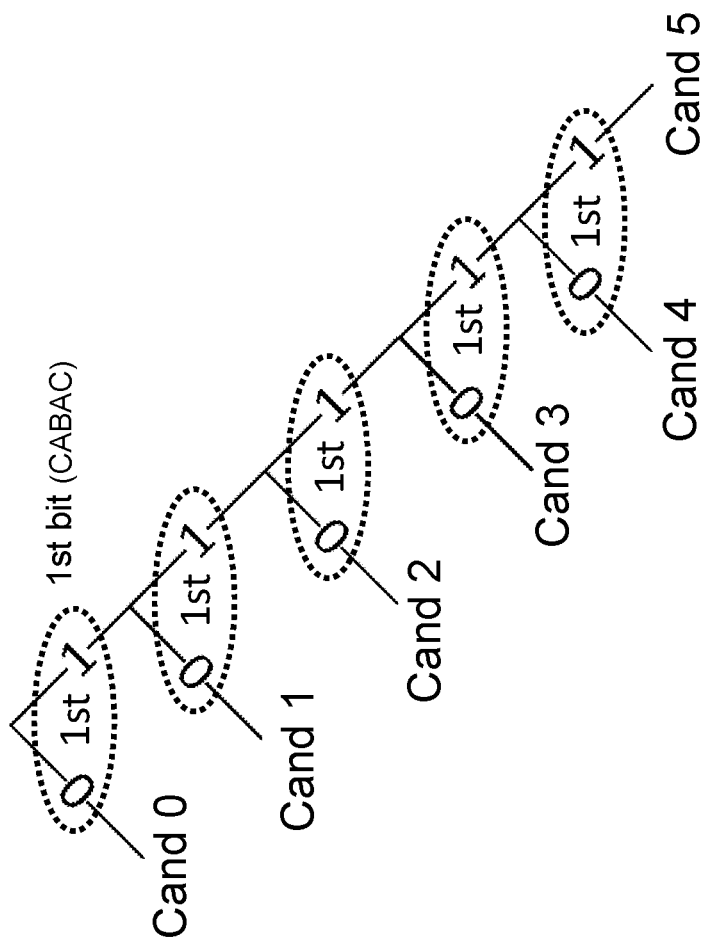
Figure 15:
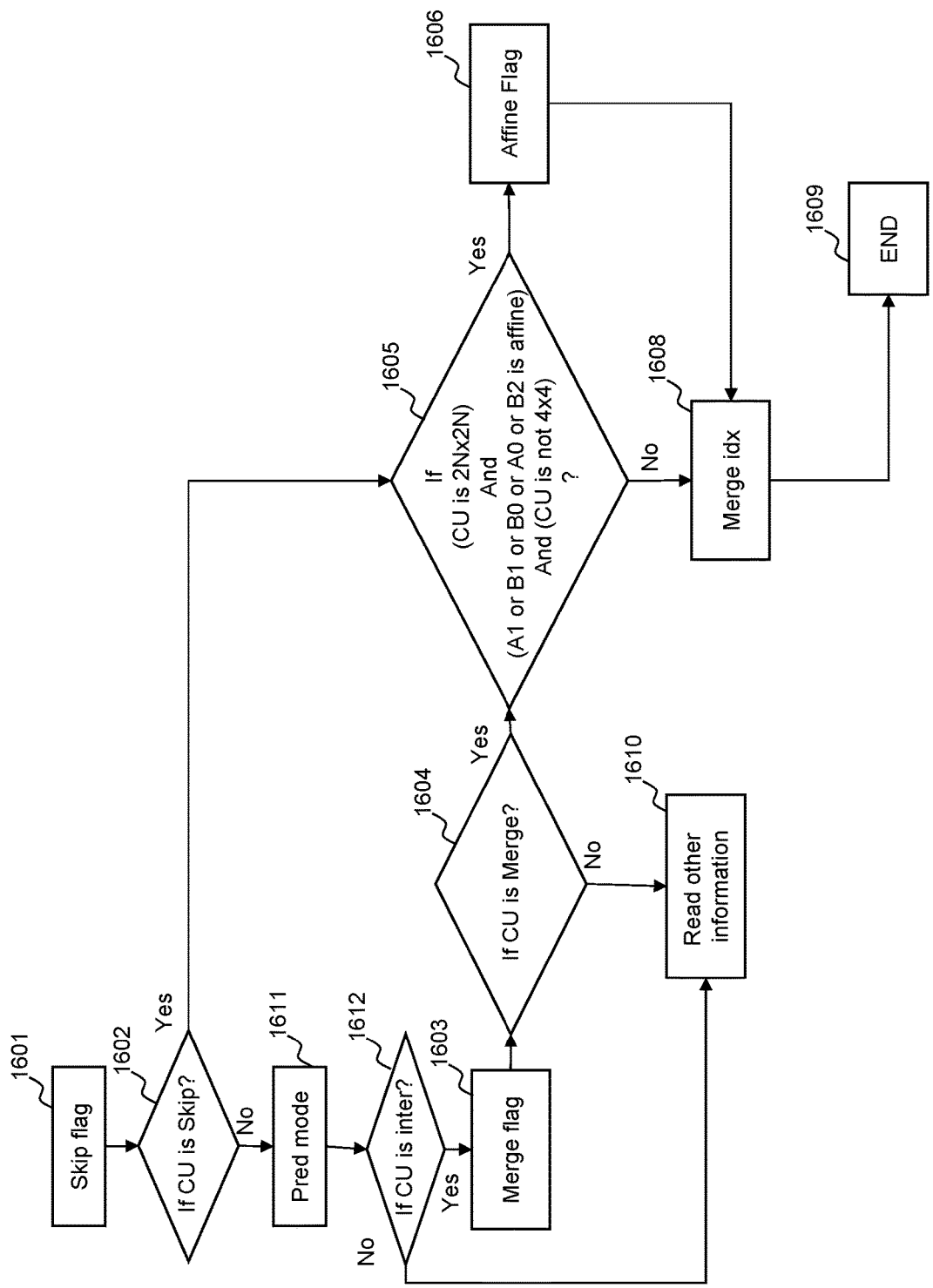
Figure 16:
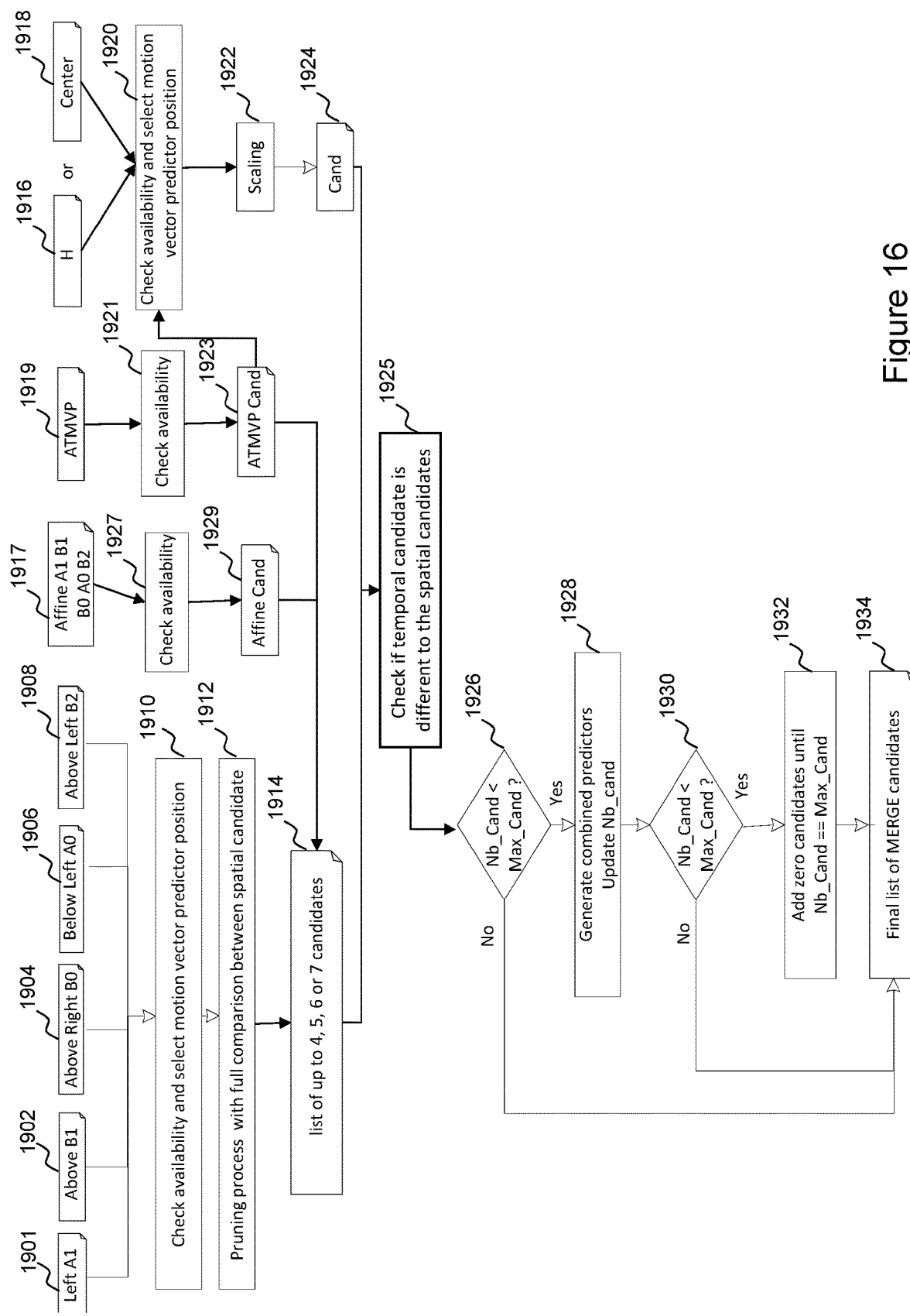
Figure 17:
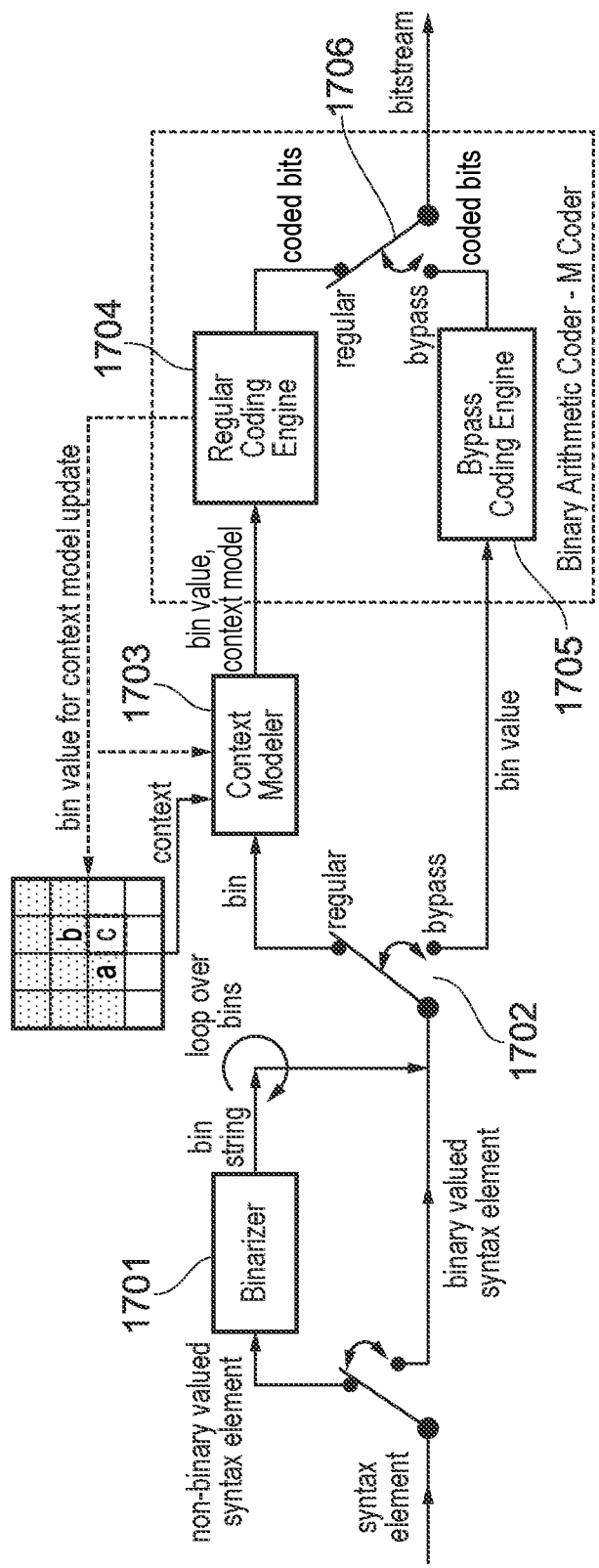
Figure 18:
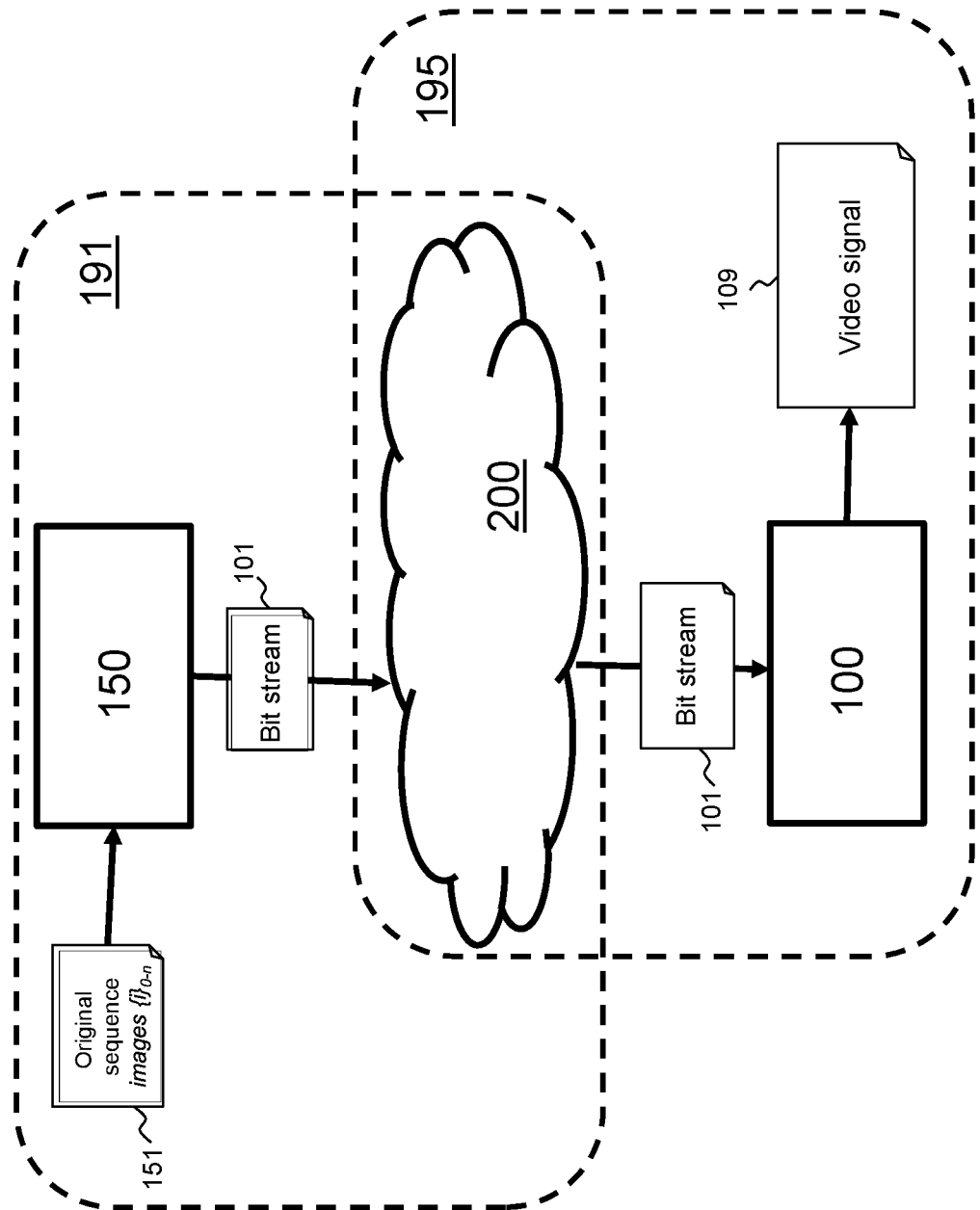
Figure 19:
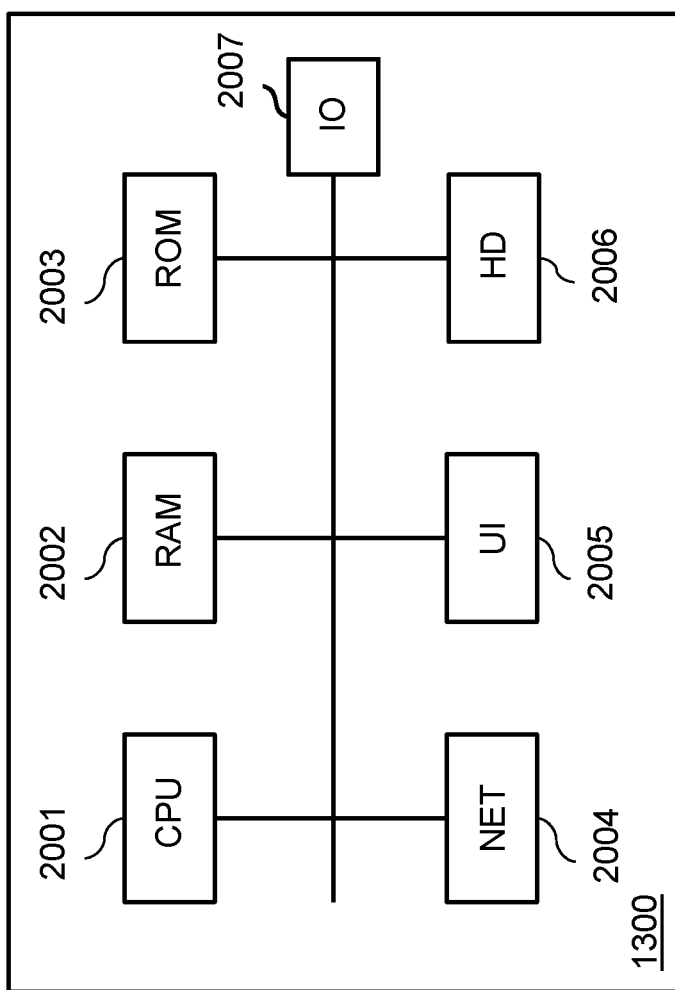
Figure 20:
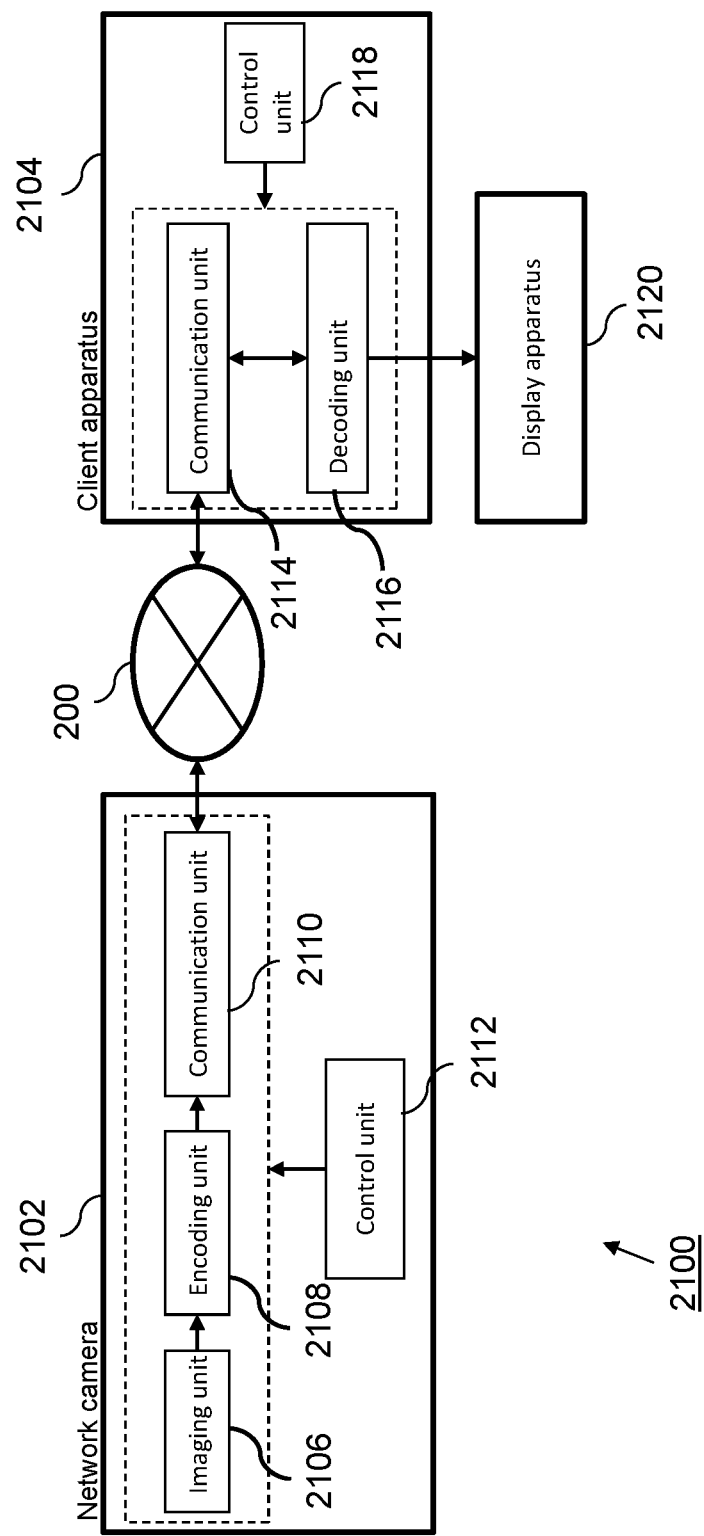

FIGS. 6(a) and 6(b) illustrates spatial and temporal blocks that can be used to generate motion vector predictors;

FIG. 7 shows simplified steps of the process of an AMVP predictor set derivation;

FIG. 8 is a schematic of a motion vector derivation process of the Merge modes;

FIG. 9 illustrates segmentation of a current block and temporal motion vector prediction;

FIG. 10A illustrates the coding of the Merge index for HEVC, or when ATMVP is not enabled at SPS level;

FIG. 10B illustrates the coding of the Merge index when ATMVP is enabled at SPS level;

FIG. 11A illustrates a simple affine motion field;

FIG. 11B illustrates a more complex affine motion field;

FIG. 12 is a flow chart of the partial decoding process of some syntax elements related to the coding mode;

FIG. 13 is a flow chart illustrating Merge candidates derivation;

FIG. 14 is a flow chart illustrating a first embodiment of the invention;

FIG. 15 is a flow chart of the partial decoding process of some syntax elements related to the coding mode in a twelfth embodiment of the invention;

FIG. 16 is a flow chart illustrating generating a list of merge candidates in the twelfth embodiment of the invention;

FIG. 17 is a block diagram for use in explaining a CABAC encoder suitable for use in embodiments of the invention;

FIG. 18 is a schematic block diagram of a computing device for implementation of one or more embodiments of the invention;

FIG. 19 is a schematic block diagram of a computing device;

FIG. 20 is a diagram illustrating a network camera system; and

Figure 21:
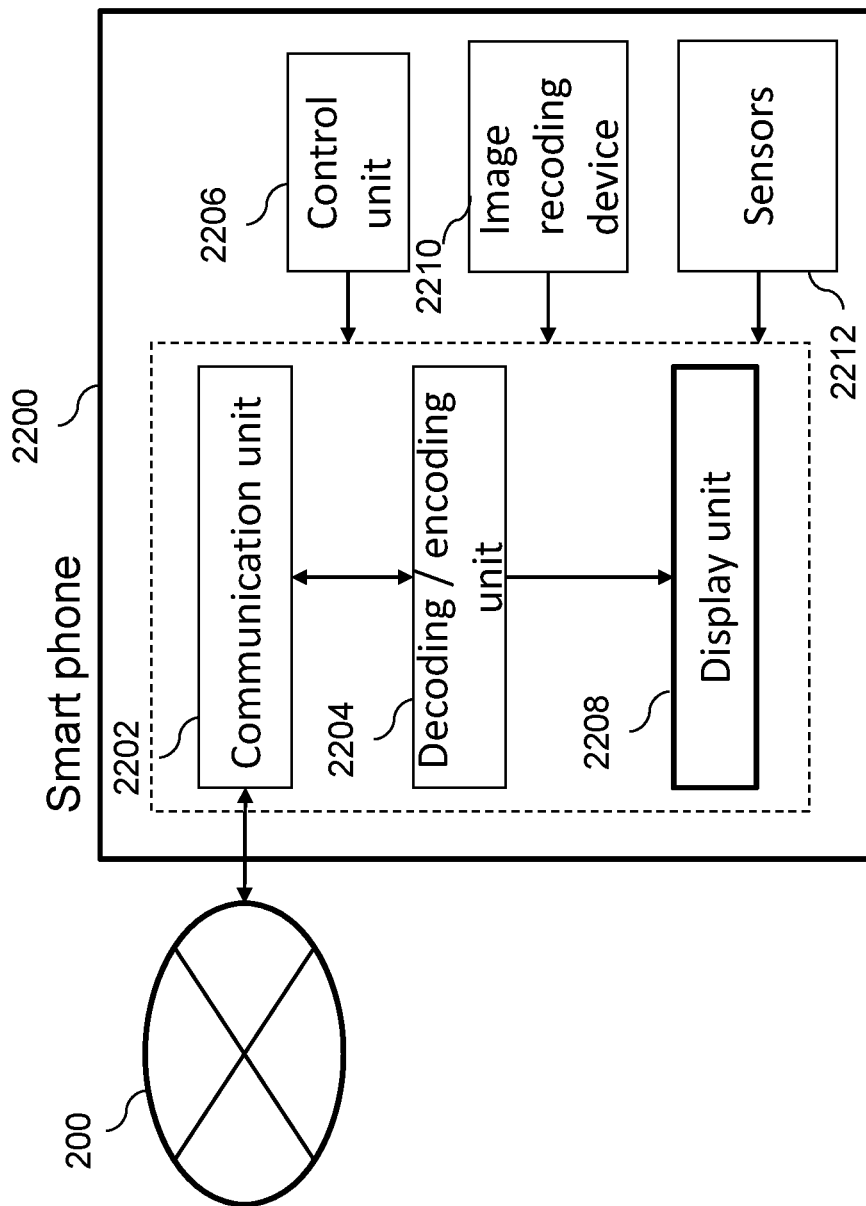

FIG. 21 is a diagram illustrating a smart phone.

DETAILED DESCRIPTION

Embodiments of the present invention described below relate to improving encoding and decoding of indexes using CABAC. Before describing the embodiments, video encoding and decoding techniques and related encoders and decoders will be described.

Figure 1:
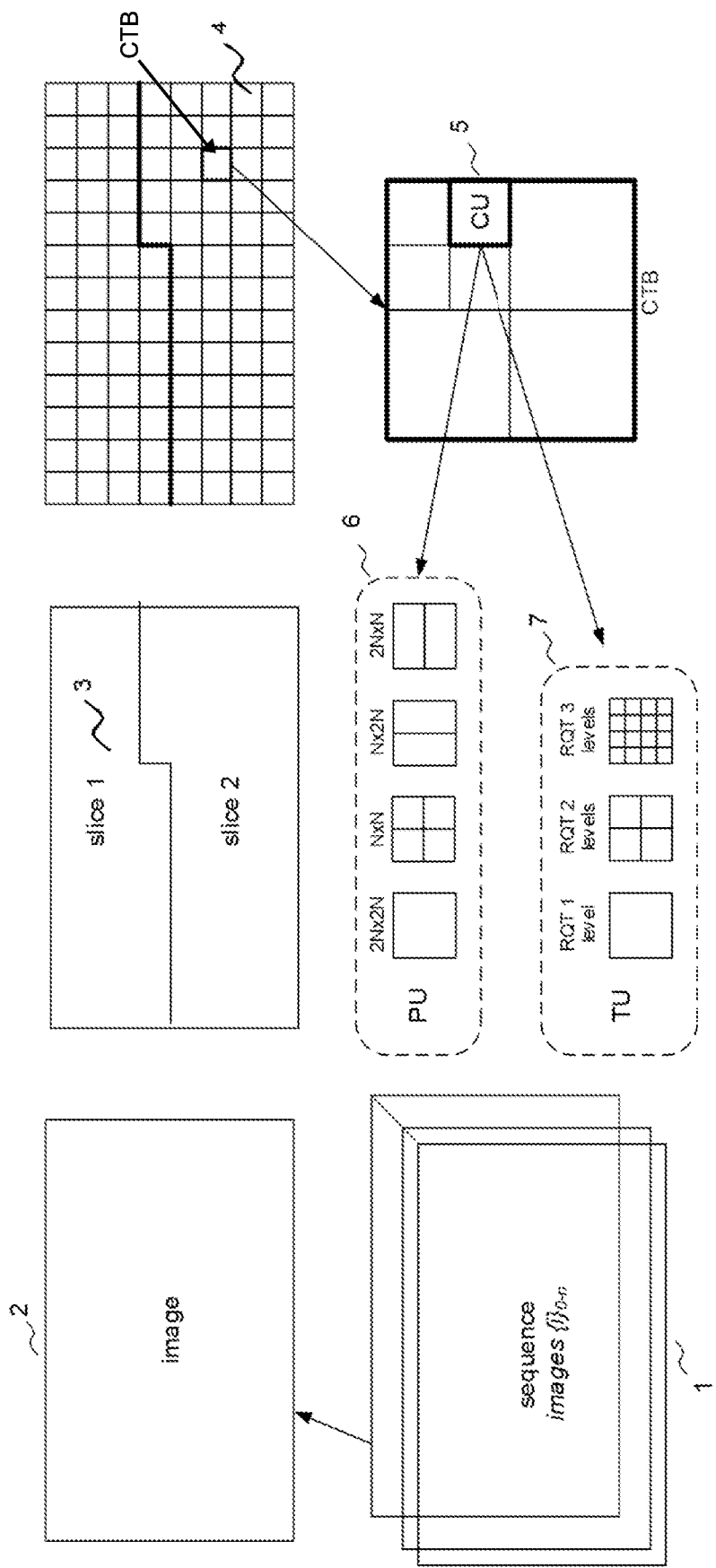
FIG. 1 is a diagram for use in explaining a coding structure used in HEVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
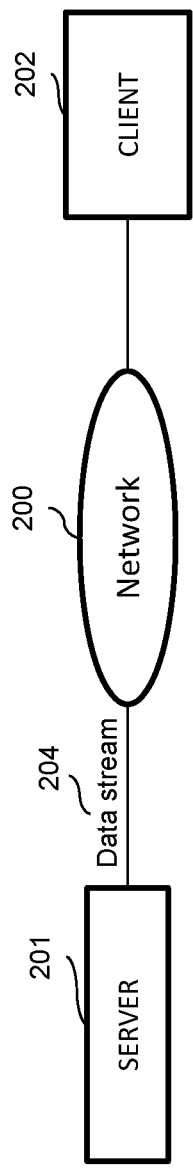
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
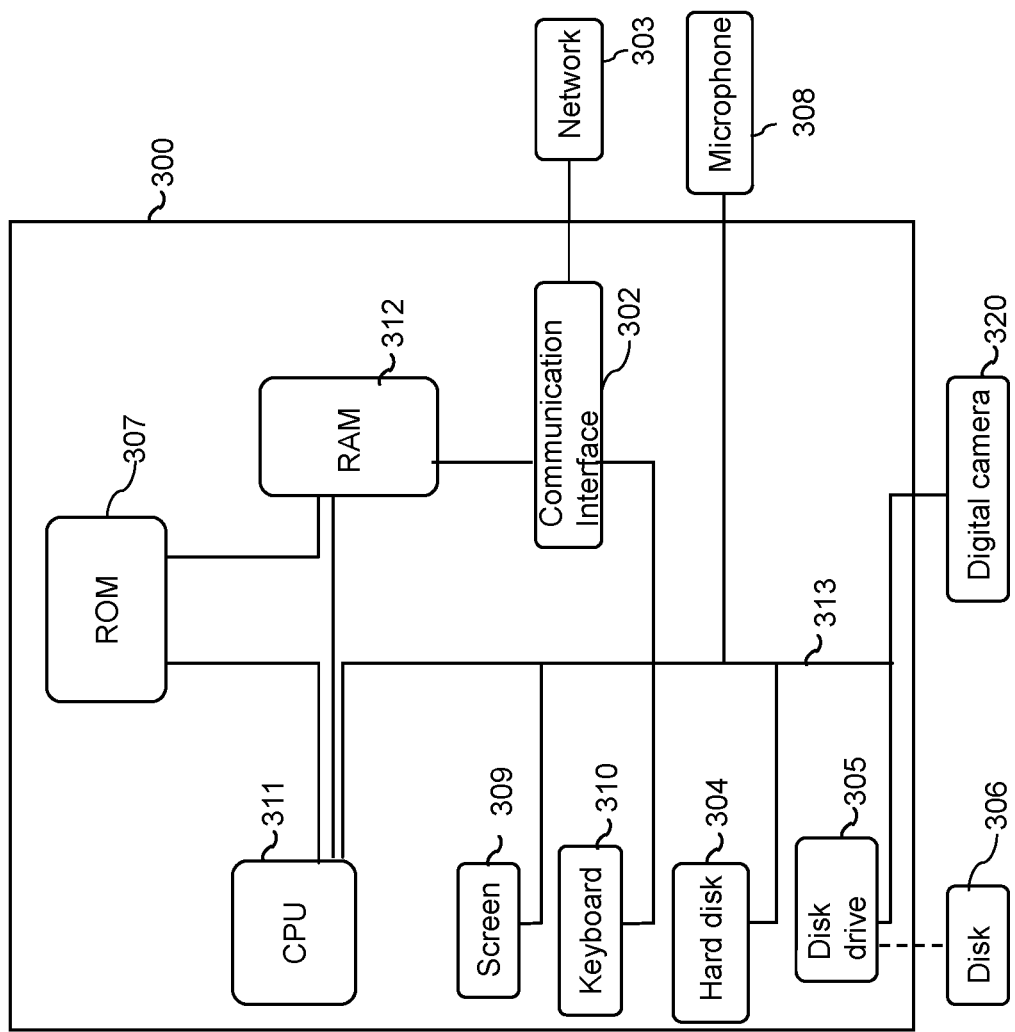
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:
- a central processing unit 311, such as a microprocessor, denoted CPU;
- a read only memory 306, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:
- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
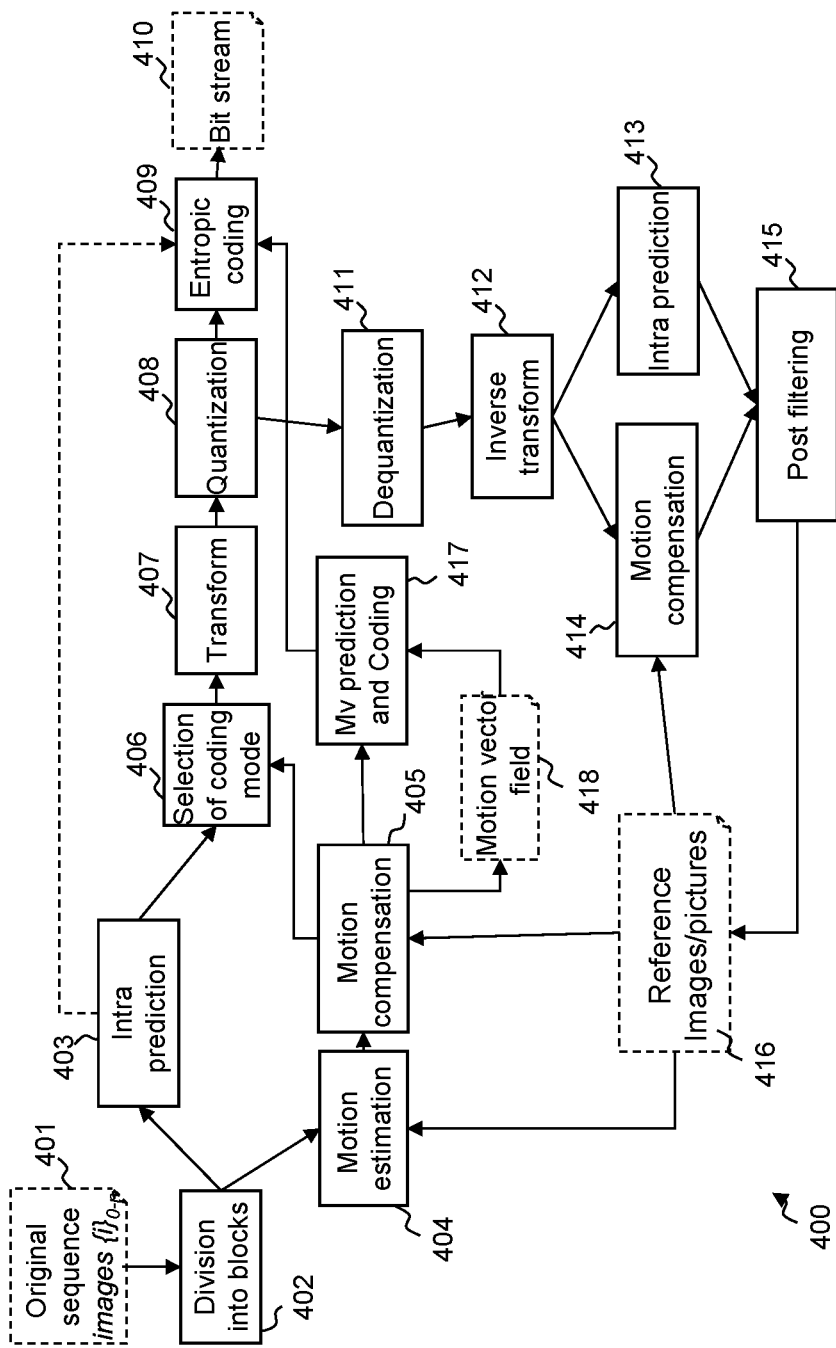
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
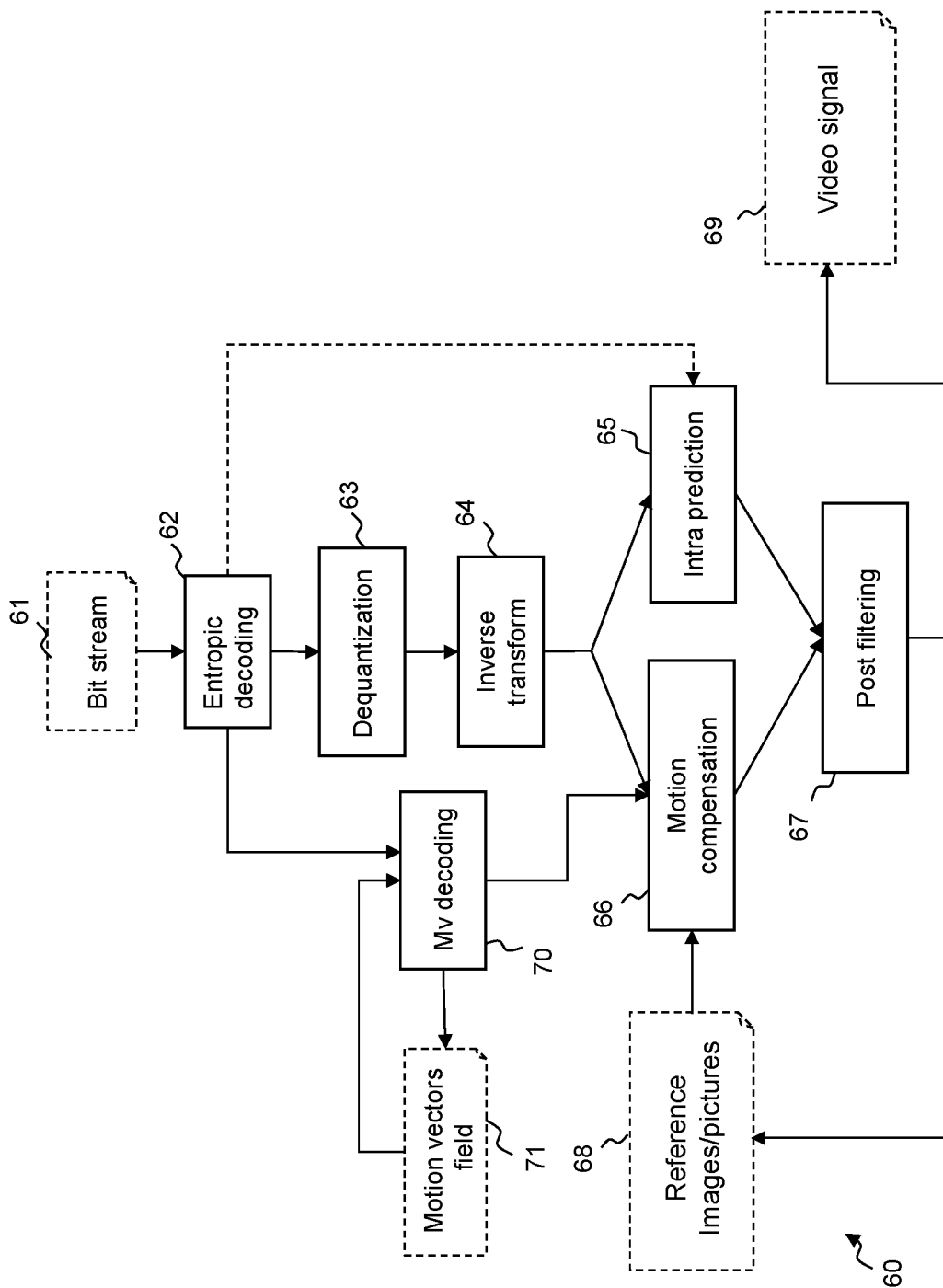
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

CABAC

HEVC uses several types of entropy coding like the Context based Adaptive Binary Arithmetic Coding (CABAC), Golomb-rice Code, or simple binary representation called Fixed Length Coding. Most of the time, a binary encoding process is performed to represent the different syntax element. This binary encoding process is also very specific and depends on the different syntax elements. The arithmetic coding represents the syntax element according to their current probabilities. CABAC is an extension of the arithmetic coding which separates the probabilities of a syntax element depending on a 'context' defined by a context variable. This corresponds to a conditional probability. The context variable may be derived from the value of the current syntax of the top left block (A2 in FIG. 6b as described in more detail below) and the above left block (B3 in FIG. 6b) which are already decoded.

CABAC has been adopted as a normative part of the H.264/AVC and H.265/HEVC standards. In H.264/AVC, it is one of two alternative methods of entropy coding. The other method specified in H.264/AVC is a low-complexity entropy-coding technique based on the usage of context-adaptively switched sets of variable-length codes, so-called Context-Adaptive Variable-Length Coding (CAVLC). Compared to CABAC, CAVLC offers reduced implementation costs at the price of lower compression efficiency. For TV signals in standard- or high-definition resolution, CABAC typically provides bit-rate savings of 10-20% relative to CAVLC at the same objective video quality. In HEVC, CABAC is the only entropy coding method.

FIG. 17 shows the main blocks of a CABAC encoder.

An input syntax element that is non-binary valued is binarized by a binarizer 1701. The coding strategy of CABAC is based on the finding that a very efficient coding of syntax-element values in a hybrid block-based video coder, like components of motion vector differences or transform-coefficient level values, can be achieved by employing a binarization scheme as a kind of preprocessing unit for the subsequent stages of context modeling and binary arithmetic coding. In general, a binarization scheme defines a unique mapping of syntax element values to sequences of binary decisions, so-called bins, which can also be interpreted in terms of a binary code tree. The design of binarization schemes in CABAC is based on a few elementary prototypes whose structure enables simple online calculation and which are adapted to some suitable model-probability distributions.

Each bin can be processed in one of two basic ways according to the setting of a switch 1702. When the switch is in the "regular" setting, the bin is supplied to a context modeler 1703 and a regular coding engine 1704. When the switch is in the "bypass" setting, the context modeler is bypassed and the bin is supplied to a bypass coding engine 1705. Another switch 1706 has "regular" and "bypass" settings similar to the switch 1702 so that the bins coded by the applicable one of the coding engines 1704 and 1705 can form a bitstream as the output of the CABAC encoder.

By decomposing each syntax element value into a sequence of bins, further processing of each bin value in CABAC depends on the associated coding-mode decision, which can be either chosen as the regular or the bypass mode. The latter is chosen for bins related to the sign information or for lower significant bins, which are assumed to be uniformly distributed and for which, consequently, the whole regular binary arithmetic encoding process is simply bypassed. In the regular coding mode, each bin value is encoded by using the regular binary arithmetic-coding engine, where the associated probability model is either determined by a fixed choice, without any context modeling, or adaptively chosen depending on the related context model. As an important design decision, the latter case is generally applied to the most frequently observed bins only, whereas the other, usually less frequently observed bins, will be treated using a joint, typically zero-order probability model. In this way, CABAC enables selective context modeling on a sub-symbol level, and hence, provides an efficient instrument for exploiting inter-symbol redundancies at significantly reduced overall modeling or learning costs. For the specific choice of context models, four basic design types are employed in CABAC, where two of them are applied to coding of transform-coefficient levels only. The design of these four prototypes is based on a priori knowledge about the typical characteristics of the source data to be modeled and it reflects the aim to find a good compromise between the conflicting objectives of avoiding unnecessary modeling-cost overhead and exploiting the statistical dependencies to a large extent.

On the lowest level of processing in CABAC, each bin value enters the binary arithmetic encoder, either in regular or bypass coding mode. For the latter, a fast branch of the coding engine with a considerably reduced complexity is used while for the former coding mode, encoding of the given bin value depends on the actual state of the associated adaptive probability model that is passed along with the bin value to the M coder—a term that has been chosen for the table-based binary arithmetic coding engine in CABAC.

Inter Coding

HEVC uses 3 different INTER modes: the Inter mode, the Merge mode and the Merge Skip mode. The main difference between these modes is the data signalling in the bitstream. For the Motion vector coding, the current HEVC standard includes a competitive based scheme for Motion vector prediction which was not present in earlier versions of the standard. It means that several candidates are competing with the rate distortion criterion at encoder side in order to find the best motion vector predictor or the best motion information for respectively the Inter or the Merge mode. An index corresponding to the best predictors or the best candidate of the motion information is inserted in the bitstream. The decoder can derive the same set of predictors or candidates and uses the best one according to the decoded index. In the Screen Content Extension of HEVC, the new coding tool called Intra Block Copy is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy.

The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process). The following describes these processes.

FIGS. 6a and 6b illustrates spatial and temporal blocks that can be used to generate motion vector predictors in Advanced Motion Vector Prediction (AMVP) and Merge modes of HEVC coding and decoding systems and FIG. 7 shows simplified steps of the process of the AMVP predictor set derivation.

Two predictors, i.e. the two spatial motion vectors of the AMVP mode, are chosen among the top blocks (indicated by letter T) and the left blocks (indicated by letter 'A') including the top corner blocks (block B2) and left corner block (block A0) and one predictor is chosen among the bottom right block (H) and centre block (Center) of the collocated block as represented in FIG. 6a.

Table 1 below outlines the nomenclature used when referring to blocks in relative terms to the current block as shown in FIGS. 6a and 6b. This nomenclature is used as shorthand but it should be appreciated other systems of labelling may be used, in particular in future versions of a standard.

TABLE 1

| Block label | Relative positional description of neighbouring block |
|---|---|
| A0 | 'Left corner' - diagonally down and to the left of the current block |
| A1 | 'Left' or 'Bottom left' - left of the bottom of the current block |
| A2 | 'Top left' - left of the top of the current block |
| B0 | 'Above right' - diagonally up and to the right of the current block |
| B1 | 'Above' - above the top right of the current block |
| B2 | 'Above left' - diagonally up and to the left of the current block |
| B3 | 'Up' - above the top left of the current block |
| H | Bottom right of a collocated block in a reference frame |
| Center | A block within a collocated block in a reference frame |

It should be noted that the 'current block' may be variable in size, for example 4×4, 16×16, 32×32, 64×64, 128×128 or any size in between. The dimensions of a block are preferably factors of 2 (i.e. $2^n \times 2^m$ where n and m are positive integers) as this results in a more efficient use of bits when using binary encoding. The current block need not be square, although this is often a preferable embodiment for coding complexity.

Turning to FIG. 7, a first step aims at selecting a first spatial predictor (Cand 1, 706) among the bottom left blocks A0 and A1, that spatial positions are illustrated in FIG. 6. To that end, these blocks are selected (700, 702) one after another, in the given order, and, for each selected block, following conditions are evaluated (704) in the given order, the first block for which conditions are fulfilled being set as a predictor:
the motion vector from the same reference list and the same reference image;
the motion vector from the other reference list and the same reference image;
the scaled motion vector from the same reference list and a different reference image; or
the scaled motion vector from the other reference list and a different reference image.

If no value is found, the left predictor is considered as being unavailable. In this case, it indicates that the related blocks were INTRA coded or those blocks do not exist.

A following step aims at selecting a second spatial predictor (Cand 2, 716) among the above right block B0, above block B1, and left above block B2, that spatial positions are illustrated in FIG. 6. To that end, these blocks are selected (708, 710, 712) one after another, in the given order, and, for each selected block, the above mentioned conditions are evaluated (714) in the given order, the first block for which the above mentioned conditions are fulfilled being set as a predictor.

Again, if no value is found, the top predictor is considered as being unavailable. In this case, it indicates that the related blocks were INTRA coded or those blocks do not exist.

In a next step (718), the two predictors, if both are available, are compared one to the other to remove one of them if they are equal (i.e. same motion vector values, same reference list, same reference index and the same direction type). If only one spatial predictor is available, the algorithm is looking for a temporal predictor in a following step.

The temporal motion predictor (Cand 3, 726) is derived as follows: the bottom right (H, 720) position of the collocated block in a previous frame is first considered in the availability check module 722. If it does not exist or if the motion vector predictor is not available, the centre of the collocated block (Centre, 724) is selected to be checked. These temporal positions (Centre and H) are depicted in FIG. 6. In any case, scaling 723 is applied on those candidates to match the temporal distance between current frame and the first frame is the reference list.

The motion predictor value is then added to the set of predictors. Next, the number of predictors (Nb_Cand) is compared (728) to the maximum number of predictors (Max_Cand). As mentioned above, the maximum number of predictors (Max_Cand) of motion vector predictors that the derivation process of AMVP needs to generate is two in the current version of HEVC standard.

If this maximum number is reached, the final list or set of AMVP predictors (732) is built. Otherwise, a zero predictor is added (730) to the list. The zero predictor is a motion vector equal to (0, 0).

As illustrated in FIG. 7, the final list or set of AMVP predictors (732) is built from a subset of spatial motion predictors (700 to 712) and from a subset of temporal motion predictors (720, 724).

As mentioned above, a motion predictor candidate of Merge mode or of Merge Skip mode represents all the required motion information: direction, list, reference frame index, and motion vectors. An indexed list of several candidates is generated by a Merge derivation process. In the current HEVC design the maximum number of candidates for both Merge modes is equal to five (4 spatial candidates and 1 temporal candidate).

FIG. 8 is a schematic of a motion vector derivation process of the Merge modes. In a first step of the derivation process, five block positions are considered (800 to 808). These positions are the spatial positions depicted in FIG. 3 with references A1, B1, B0, A0, and B2. In a following step, the availability of the spatial motion vectors is checked and at most five motion vectors are selected (810). A predictor is considered as available if it exists and if the block is not INTRA coded. Therefore, selecting the motion vectors corresponding to the five blocks as candidates is done according to the following conditions:
if the "left" A1 motion vector (800) is available (810), i.e. if it exists and if this block is not INTRA coded, the motion vector of the "left" block is selected and used as a first candidate in list of candidate (814);
if the "above" B1 motion vector (802) is available (810), the candidate "above" block motion vector is compared to "left" A1 motion vector (812), if it exists. If B1 motion vector is equal to A1 motion vector, B1 is not added to the list of spatial candidates (814). On the contrary, if B1 motion vector is not equal to A1 motion vector, B1 is added to the list of spatial candidates (814);
if the "above right" B0 motion vector (804) is available (810), the motion vector of the "above right" is compared to B1 motion vector (812). If B0 motion vector is equal to B1 motion vector, B0 motion vector is not added to the list of spatial candidates (814). On the contrary, if B0 motion vector is not equal to B1 motion vector, B0 motion vector is added to the list of spatial candidates (814);

if the "below left" A0 motion vector (806) is available (810), the motion vector of the "below left" is compared to A1 motion vector (812). If A0 motion vector is equal to A1 motion vector, A0 motion vector is not added to the list of spatial candidates (814). On the contrary, if A0 motion vector is not equal to A1 motion vector, A0 motion vector is added to the list of spatial candidates (814); and if the list of spatial candidates doesn't contain four candidates, the availability of "above left" B2 motion vector (808) is checked (810). If it is available, it is compared to A1 motion vector and to B1 motion vector. If B2 motion vector is equal to A1 motion vector or to B1 motion vector, B2 motion vector is not added to the list of spatial candidates (814). On the contrary, if B2 motion vector is not equal to A1 motion vector or to B1 motion vector, B2 motion vector is added to the list of spatial candidates (814).

At the end of this stage, the list of spatial candidates comprises up to four candidates.

For the temporal candidate, two positions can be used: the bottom right position of the collocated block (816, denoted H in FIG. 6) and the centre of the collocated block (818). These positions are depicted in FIG. 6.

As for the AMVP motion vector derivation process, a first step aims at checking (820) the availability of the block at the H position. Next, if it is not available, the availability of the block at the centre position is checked (820). If at least one motion vector of these positions is available, the temporal motion vector can be scaled (822), if needed, to the reference frame having index 0, for both list L0 and L1, in order to create a temporal candidate (824) which is added to the list of Merge motion vector predictor candidates. It is positioned after the spatial candidates in the list. The lists L0 and L1 are 2 reference frame lists containing zero, one or more reference frames.

If the number (Nb_Cand) of candidates is strictly less (826) than the maximum number of candidates (Max_Cand that value is signalled in the bit-stream slice header and is equal to five in the current HEVC design) and if the current frame is of the B type, combined candidates are generated (828). Combined candidates are generated based on available candidates of the list of Merge motion vector predictor candidates. It mainly consists in combining the motion vector of one candidate of the list L0 with the motion vector of one candidate of list L1.

If the number (Nb_Cand) of candidates remains strictly less (830) than the maximum number of candidates (Max_Cand), zero motion candidates are generated (832) until the number of candidates of the list of Merge motion vector predictor candidates reaches the maximum number of candidates.

At the end of this process, the list or set of Merge motion vector predictor candidates is built (834). As illustrated in FIG. 8, the list or set of Merge motion vector predictor candidates is built (834) from a subset of spatial candidates (800 to 808) and from a subset of temporal candidates (816, 818).

Alternative Temporal Motion Vector Prediction (ATMVP)

The alternative temporal motion vector prediction (ATMVP) is a particular motion compensation. Instead of considering only one motion information for the current block from a temporal reference frame, each motion information of each collocated block is considered. So this temporal motion vector prediction gives a segmentation of the current block with the related motion information of each sub-block as depicted in FIG. 9.

In the current VTM reference software, ATMVP is signalled as a merge candidate inserted in the list of Merge candidates. When ATMVP is enabled at SPS level, the maximum number of Merge candidates is increased by one. So 6 candidates are considered instead of 5 when this mode is disabled.

In addition when this prediction is enabled at SPS level, all bins of merge index are context coded by CABAC. While in HEVC or when ATMVP is not enabled at SPS level, only the first bin is context coded and the remaining bins are context by-pass coded. FIG. 10A illustrates the coding of the Merge index for HEVC, or when ATMVP is not enabled at SPS level. This corresponds to a unary max coding. In addition the first bit is CABAC coded and the other bits are bypass CABAC coded.

FIG. 10B illustrates the coding of the Merge index when ATMVP is enabled at SPS level. In addition all bits are CABAC coded (from the $1^{st}$ to the $5^{th}$ bit). It should be noted that each index has its own context—in other words their probabilities are separated.

Affine Mode

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM. As shown in FIG. 11A, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})w}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad (2)$$

After derived by Equation 2, M and N may be adjusted downward if necessary to make it a divisor of w and h, respectively.

To derive motion vector of each M×N sub-block, the motion vector of the center sample of each sub-block, as shown in FIG. 6a, is calculated according to Equation 1, and rounded to 1/16 fraction accuracy. Then motion compensation interpolation filters are applied to generate the prediction of each sub-block with derived motion vector.

The affine mode is a motion compensation mode as inter modes (AMVP, Merge, Merge Skip). Its principle is to generate one motion information per pixel according to 2 or 3 neighbouring motion information. In the current VTM reference software, the affine mode derives one motion information for each 4×4 block as depicted in FIG. 11A. This mode is available for AMVP and both Merge modes are enabled thanks to a flag. This flag is CABAC coded. In an embodiment, the context depends on the sum of affine flags of the left block (position A2 of FIG. 6b) and the above left block (position B3 of FIG. 6b).

So three context variables (0, 1 or 2) are possible in the JEM for the affine flag given by the following formula:

$$Ctx = IsAffine(A2) + IsAffine(B3)$$

Where IsAffine(block) is a function which returns 0 if the block is not an affine block and 1 if the block is affine.

Affine Merge candidate derivation

In the JEM, the affine Merge mode (Merge or Merge Skip) is derived from the first neighbouring block which is affine among blocks at positions A1, B1, B0, A0, B2. These positions are depicted in FIGS. 6a and 6b. However, how the affine parameter is derived is not completely defined, and the present invention aims to improve at least this aspect.

Affine Merge Signalling

FIG. 12 is a flow chart of the partial decoding process of some syntax elements related to the coding mode. In this figure the Skip flag (1201), the prediction mode (1211), the Merge flag (1203) the Merge Index (1208) and the affine flag (1207) can be decoded.

For all CU in an Inter slice, the Skip flag is decoded (1201). If the CU is not Skip (1202), the pred mode (Prediction mode) is decoded (1211). This syntax element indicates if the current CU is an Inter or an Intra mode. Please note that if the CU is Skip (1202), its current mode is the Inter mode. If the CU (1212), the CU is coded in AMVP or in Merge mode. If the CU is Inter (1212), the Merge flag is decoded (1203). If the CU is Merge (1204) or if the CU is Skip (1202), it is verified (1205) if the affine flag (1206) needs to be decoded. This flag is decoded if the current CU is a 2N×2N CU, which means in the current VVC that the height and the width of the CU shall be equal. Moreover, at least one neighbouring CU A1 or B1 or B0 or A0 or B2 must be coded with the affine mode (Merge or AMVP). Eventually the current CU shall not be a 4×4 CU but by default the CU 4×4 are disabled in the VTM reference software. If this condition (1205) is false, it is sure that the current CU is coded with the classical Merge mode or Merge Skip mode and a Merge Index is decoded (1208). If the Affine Flag (1206) is set equal to 1 (1207), the CU is a Merge affine CU or a Merge Skip Affine CU and the Merge index (1208) doesn't need to be decoded. Otherwise, the current CU is a classical (basic) Merge or Merge Skip CU and the Merge index candidate (1208) is decoded.

In this specification 'signalling' may refer to inserting into, or extracting from, the bitstream one or more syntax element representing the enabling or disabling of a mode other information.

Merge Candidates Derivation

FIG. 13 is a flow chart illustrating the Merge candidates derivation. This derivation has been built on top of the Merge List derivation of HEVC represented in FIG. 8. The main changes compared to HEVC are the addition of the ATMVP candidate (1319, 1321, 1323), the full duplicate checks of candidates (1320, 1325) and a new order of the candidates. The ATMVP prediction is set as a special candidate as it represents several motion information of the current CU. The value of the first sub-block (top left) is compared to the temporal candidate and the temporal candidate is not added in the list of Merge if they are equal (1320). The ATMVP candidate is not compared to other spatial candidates. In opposite to the temporal candidate which is compared to each spatial candidate already in the list (1325) and not added in the Merge candidate list if it is a duplicate candidate.

When a spatial candidate is added in the list it is compared to the other spatial candidates in the list (1310) which is not the case in the final version of HEVC.

In the current VTM version the list of merge candidates is set as the following order as it has been determined to provide the best results over the coding test conditions:

A1
B1
B0
A0
ATMVP
B2
TEMPORAL
Combined
Zero_MV

It is important to note that spatial candidate B2 is set after the ATMVP candidate.

In addition, when ATMVP is enabled at slice level the maximum number in the list of candidates is 6 instead of 5.

Exemplary embodiments of the invention will now be described with reference to FIGS. 14-17, 19 and 20. It should be noted that the embodiments may be combined unless explicitly stated otherwise; for example certain combinations of embodiments may improve coding efficiency at increased complexity, but this may be acceptable in certain use cases.

First Embodiment

As noted above, in the current VTM reference software, ATMVP is signalled as a Merge candidate inserted in the list of Merge candidates. ATMVP can be enabled or disabled for a whole sequence (at SPS level). When ATMVP is disabled, the maximum number of Merge candidates is 5. When ATMVP is enabled, the maximum number of Merge candidates is increased by one from 5 to 6.

In the encoder, the list of Merge candidates is generated using the method of FIG. 13. One Merge candidate is selected from the list of Merge candidates, for example based on a rate-distortion criterion. The selected Merge candidate is signalled to the decoder in the bitstream using a syntax element called the Merge index.

In the current VTM reference software, the manner of coding the Merge index is different depending on whether ATMVP is enabled or disabled.

FIG. 10A illustrates the coding of the Merge index when ATMVP is not enabled at SPS level. The 5 Merge candidates Cand0, Cand1, Cand2, Cand3 and Cand4 are coded 0, 10, 110, 1110 and 1111 respectively. This corresponds to a unary max coding. In addition, the first bit is coded by CABAC using a single context and the other bits are bypass coded.

FIG. 10B illustrates the coding of the Merge index when ATMVP is enabled. The 6 Merge candidates Cand0, Cand1, Cand2, Cand3, Cand4 and Cand5 are coded 0, 10, 110, 1110, 11110 and 11111 respectively. In this case, all bits of the merge index (from the $1^{st}$ to the $5^{th}$ bit) are context coded by CABAC. Each bit has its own context and there are separate probability models for the different bits.

In the first embodiment of the present invention, as shown in FIG. 14, when ATMVP is included as a Merge candidate in the list of Merge candidates (for example, when ATMVP is enabled at SPS level) the coding of the Merge index is modified so that only the first bit of the Merge index is coded by CABAC using a single context. The context is set in the same manner as in the current VTM reference software when ATMVP is not enabled at SPS level The other bits (from the $2^{nd}$ to the $5^{th}$ bit) are bypass coded. When ATMVP is not included as a Merge candidate in the list of Merge candidates (for example, when ATMVP is disabled at SPS level) there are 5 Merge candidates. Only the first bit of the Merge index is coded by CABAC using a single context. The context is set in the same manner as in the current VTM reference software when ATMVP is not enabled at SPS level The other bits (from the $2^{nd}$ to the $4^{th}$ bit) are bypass decoded.

The decoder generates the same list of Merge candidates as the encoder. This may be accomplished by using the method of FIG. 13. When ATMVP is not included as a Merge candidate in the list of Merge candidates (for example, when ATMVP is disabled at SPS level) there are 5 Merge candidates. Only the first bit of the Merge index is decoded by CABAC using a single context. The other bits (from the $2^{nd}$ to the $4^{th}$ bit) are bypass decoded. In contrast to the current reference software, when ATMVP is included as a Merge candidate in the list of Merge candidates (for example, when ATMVP is enabled at SPS level), only the first bit of the Merge index is decoded by CABAC using a single context in the decoding of the Merge index. The other bits (from the $2^{nd}$ to the $5^{th}$ bit) are bypass decoded. The decoded merge index is used to identify the Merge candidate selected by the encoder from among the list of Merge candidates.

The advantage of this embodiment compared to the VTM2.0 reference software is a complexity reduction of the merge index decoding and decoder design (and encoder design) without impact on coding efficiency. Indeed, with this embodiment only 1 CABAC state is needed for the Merge index instead of 5 for the current VTM Merge index coding/decoding. Moreover, it reduces the worst-case complexity because the other bits are CABAC bypass coded which reduces the number of operations compared to coding all bits with CABAC.

Second Embodiment

In a second embodiment, all bits of the Merge index are CABAC coded but they all share the same context. There may be a single context as in the first embodiment, which in this case is shared among the bits. As a result, when ATMVP is included as a Merge candidate in the list of Merge candidates (for example, when ATMVP is enabled at SPS level), only one context is used, compared to 5 in the VTM2.0 reference software. The advantage of this embodiment compared to the VTM2.0 reference software is a complexity reduction of the merge index decoding and decoder design (and encoder design) without impact on coding efficiency.

Alternatively, as described below in connection with the third to fifteenth embodiments, a context variable may be shared among the bits so that two or more contexts are available but the current context is shared by the bits.

When ATMVP is disabled the same context is still used for all bits.

This embodiment and all subsequent embodiments can be applied even if ATMVP is not an available mode or is disabled.

In a variant of the second embodiment, any two or more bits of the Merge index are CABAC coded and share the same context. Other bits of the Merge index are bypass coded. For example, the first N bits of the Merge index may be CABAC coded, where N is two or more.

Third Embodiment

In the first embodiment the first bit of the Merge index was CABAC coded using a single context.

In the third embodiment, a context variable for a bit of the Merge index depends on the value of the Merge index of a neighbouring block. This allows more than one context for the target bit, with each context corresponding to a different value of the context variable.

The neighbouring block may be any block already decoded, so that its Merge index is available to the decoder by the time the current block is being decoded. For example, the neighbouring block may be any of the blocks A0, A1, A2, B0, B1, B2 and B3 shown in FIG. 6b.

In a first variant, just the first bit is CABAC coded using this context variable.

In a second variant, the first N bits of the Merge index, where N is two or more, are CABAC coded and the context variable is shared among those N bits.

In a third variant, any N bits of the Merge index, where N is two or more, are CABAC coded and the context variable is shared among those N bits.

In a fourth variant, the first N bits of the Merge index, where N is two or more, are CABAC coded and N context variables are used for those N bits. Assuming the context variables have K values, K×N CABAC states are used. For example, in the present embodiment, with one neighbouring block, the context variable may conveniently have 2 values, e.g. 0 and 1. In other words 2N CABAC states are used.

In a fifth variant, any N bits of the Merge index, where N is two or more, are adaptive-PM coded and N context variables are used for those N bits.

The same variants are applicable to the fourth to sixteenth embodiments described hereinafter.

Fourth Embodiment

In the fourth embodiment, the context variable for a bit of the Merge index depends on the respective values of the Merge index of two or more neighbouring blocks. For example, a first neighbouring block may be a left block A0, A1 or A2 and a second neighbouring block may be an upper block B0, B1, B2 or B3. The manner of combining the two or more Merge index values is not particularly limited. Examples are given below.

The context variable may conveniently have 3 different values, e.g. 0, 1 and 2, in this case as there are two neighbouring blocks. If the fourth variant described in connection with the third embodiment is applied to this embodiment with 3 different values, therefore, K is 3 instead of 2. In other words 3N CABAC states are used.

Fifth Embodiment

In the fifth embodiment, the context variable for a bit of the Merge index depends on the respective values of the Merge index of the neighbouring blocks A2 and B3.

Sixth Embodiment

In the sixth embodiment, the context variable for a bit of the Merge index depends on the respective values of the Merge index of the neighbouring blocks A1 and B1. The advantage of this variant is alignment with the Merge candidates derivation. As a result, in some decoder and encoder implementations, memory access reductions can be achieved.

Seventh Embodiment

In the seventh embodiment, the context variable for a bit having bit position idx_num in the Merge Index of the current block is obtained according to the following formula:

ctxIdx=(Merge_index_left==idx_num)+
(Merge_index_up==idx_num)

where Merge_index_left is the Merge index for a left block, Merge_index_up is the Merge index for an upper block, and the symbol == is the equality symbol.

When there are 6 Merge candidates, for example, 0<=idx_num<=5.

The left block may be the block A1 and the upper block may be the block B1 (as in the sixth embodiment). Alternatively, the left block may be the block A2 and the upper block may be the block B3 (as in the fifth embodiment).

The formula (Merge_index_left==idx_num) is equal to 1 if the Merge index for the left block is equal to idx_num. The following table gives the results of this formula (Merge_index_left==idx_num):

| | idx_num | | | | |
|---|---|---|---|---|---|
| Merge_index_left | 0 | 1 | 2 | 3 | 4 |
| 0 | 1 | 0 | 0 | 0 | 0 |
| 1 | 0 | 1 | 0 | 0 | 0 |
| 2 | 0 | 0 | 1 | 0 | 0 |
| 3 | 0 | 0 | 0 | 1 | 0 |
| 4 | 0 | 0 | 0 | 0 | 1 |
| 5 | 0 | 0 | 0 | 0 | 0 |

Of course the table of the formula (Merge_index_up==idx_num) is the same.

The following table gives the unary max code of each Merge index value and the relative bit position for each bit. This table corresponds to FIG. 10B.

| | Unary max code | | | | |
|---|---|---|---|---|---|
| Merge_index_left | 0 | 1 | 2 | 3 | 4 |
| 0 | 0 | | | | |
| 1 | 1 | 0 | | | |
| 2 | 1 | 1 | 0 | | |
| 3 | 1 | 1 | 1 | 0 | |
| 4 | 1 | 1 | 1 | 1 | 0 |
| 5 | 1 | 1 | 1 | 1 | 1 |

If the left block is not a merge block or an affine merge block it is considered that the left block is not available. The same condition is applied for the upper block.

For example, when only the first bit is CABAC coded, the context variable ctxIdx is set equal to:
  0 if no left and up block has a merge index or if the left block Merge index is not the first index (i.e. not 0) and if the upper block Merge index is not the first index (i.e. not 0);
  1 if one but not the other of the left and upper blocks has its merge index equal to the first index; and
  2 if for each of the left and upper blocks the merge index is equal to the first index.

More generally, for a target bit at position idx_num which is CABAC coded, the context variable ctxIdx is set equal to:
  0 if no left and up block has a merge index or if the left block Merge index is not the $i^{th}$ index (where i=idx_num) and if the upper block Merge index is not the $i^{th}$ index;
  1 if one but not the other of the left and upper blocks has its merge index equal to the the $i^{th}$ index; and
  2 if for each of the left and upper blocks the merge index is equal to the $i^{th}$ index. Here, the $i^{th}$ index means the first index when i=0, the second index when i=1, and so on.

Eighth Embodiment

In the eighth embodiment, the context variable for a bit having bit position idx_num in the Merge Index of the current block is obtained according to the following formula:

Ctx=(Merge_index_left>idx_num)+
(Merge_index_up>idx_num) where Merge_index_left is the Merge index for a left block, Merge_index_up is the Merge index for an upper block, and the symbol>means "greater than".

When there are 6 Merge candidates, for example, 0<=idx_num<=5.

The left block may be the block A1 and the upper block may be the block B1 (as in the fifth embodiment). Alternatively, the left block may be the block A2 and the upper block may be the block B3 (as in the sixth embodiment).

The formula (Merge_index_left>idx_num) is equal to 1 if the Merge index for the left block is greater than idx_num. If the left block is not a merge block or an affine merge block it is considered that the left block is not available. The same condition is applied for the upper block.

The following table gives the results of this formula (Merge_index_left>idx_num):

| | idx_num | | | | |
|---|---|---|---|---|---|
| Merge_index_left | 0 | 1 | 2 | 3 | 4 |
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |

-continued

| | idx_num | | | | |
|---|---|---|---|---|---|
| Merge_index_left | 0 | 1 | 2 | 3 | 4 |
| 4 | 1 | 1 | 1 | 1 | 0 |
| 5 | 1 | 1 | 1 | 1 | 1 |

For example, when only the first bit is CABAC coded, the context variable ctxIdx is set equal to:
- 0 if no left and up block has a merge index or if the left block Merge index is less than or equal to the first index (i.e. not 0) and if the upper block Merge index is less than or equal to the first index (i.e. not 0);
- 1 if one but not the other of the left and upper blocks has its merge index greater than the first index; and
- 2 if for each of the left and upper blocks the merge index is greater than the first index.

More generally, for a target bit at position idx_num which is CABAC coded, the context variable ctxIdx is set equal to:
- 0 if no left and up block has a merge index or if the left block Merge index is less than the $i^{th}$ index (where i=idx_num) and if the upper block Merge index is less than or equal to the $i^{th}$ index;
- 1 if one but not the other of the left and upper blocks has its merge index greater than the the $i^{th}$ index; and
- 2 if for each of the left and upper blocks the merge index is greater than the $i^{th}$ index.

The eighth embodiment provides a further coding efficiency increase over the seventh embodiment.

Ninth Embodiment

In the fourth to eighth embodiments, the context variable for a bit of the Merge index of the current block depended on the respective values of the Merge index of two or more neighbouring blocks.

In the ninth embodiment, the context variable for a bit of the Merge index of the current block depends on the respective Merge flags of two or more neighbouring blocks. For example, a first neighbouring block may be a left block A0, A1 or A2 and a second neighbouring block may be an upper block B0, B1, B2 or B3.

The Merge flag is set to 1 when a block is encoded using the Merge mode, and is set to 0 when another mode such as Skip mode or Affine Merge mode. Note that in VMT2.0 Affine Merge is a distinct mode from the basic or "classical" Merge mode. The Affine Merge mode may be signalled using a dedicated Affine flag. Alternatively, the list of Merge candidates may include an Affine Merge candidate, in which case the Affine Merge mode may be selected and signalled using the Merge index.

The context variable is then set to:
- 0 if neither the left nor the upper neighbouring block has its Merge flag set to 1;
- 1 if one but not the other of the left and upper neighbouring blocks has its Merge flag set to 1; and
- 2 if each of the left and upper neighbouring blocks has its Merge flag set to 1.

This simple measure achieves a coding efficiency improvement over VTM2.0. Another advantage, compared to the seventh and eighth embodiments, is a lower complexity because only the Merge flags and not the Merge indexes of the neighbouring blocks need to be checked.

In a variant, the context variable for a bit of the Merge index of the current block depends on the Merge flag of a single neighbouring block.

Tenth Embodiment

In the third to ninth embodiments, the context variable for a bit of the Merge index of the current block depended on Merge index values or Merge flags of one or more neighbouring blocks.

In the tenth embodiment, the context variable for a bit of the Merge index of the current block depends on the value of the Skip flag for the current block (current Coding Unit, or CU). The Skip flag is equal to 1 when the current block uses the Merge Skip mode, and is equal to 0 otherwise.

The Skip flag is a first example of another variable or syntax element already been decoded or parsed for the current block. This other variable or syntax element preferably is an indicator of a complexity of the motion information in the current block. Since the occurrences of the Merge index values depend on the complexity of the motion information a variable or syntax element such as the Skip flag is generally correlated with the merge index value.

More specifically, the Merge Skip mode is generally selected for static scenes or scenes involving constant motion. Consequently, the merge index value is generally lower for the Merge Skip mode than for the classical merge mode which is used to encode an inter prediction which contains a block residual. This occurs generally for more complex motion. However, the selection between these modes is also often related to the quantization and/or the RD criterion.

This simple measure provides a coding efficiency increase over VTM2.0. It is also very simple to implement as it does not involve neighbouring blocks or checking Merge index values.

In a first variant, the context variable for a bit of the Merge index of the current block is simply set equal to the Skip flag of the current block. The bit may be the first bit only. Other bits are bypass coded as in the first embodiment.

In a second variant, all bits of the Merge index are CABAC coded and each of them has its own context variable depending on the Merge flag. This requires 10 states of probabilities when there are 5 CABAC-coded bits in the Merge index (corresponding to 6 Merge candidates).

In a third variant, to limit the number of states, only N bits of the Merge index are CABAC coded, where N is two or more, for example the first N bits. This requires 2N states. For example, when the first 2 bits are CABAC coded, 4 states are required.

Generally, in place of the Skip flag, it is possible to use any other variable or syntax element that has already been decoded or parsed for the current block and that is an indicator of a complexity of the motion information in the current block.

Eleventh Embodiment

The eleventh embodiment relates to Affine Merge signalling as described previously with reference to FIGS. 11A, 11B and 12.

In the eleventh embodiment, the context variable for a CABAC coded bit of the Merge index of the current block (current CU) depends on the Affine Merge candidates, if any, in the list of Merge candidates. The bit may be the first bit only of the Merge index, or the first N bits, where N is two or more, or any N bits. Other bits are bypass coded.

Affine prediction is designed for compensating complex motion. Accordingly, for complex motion the merge index generally has higher values than for less complex motion. It follows that if the first affine merge candidate is far down the list, or if there is no affine merge candidate at all, the merge index of the current CU is likely to have a small value.

It is therefore effective for the context variable to depend on the presence and/or position of at least one Affine Merge candidate in the list.

For example, the context variable may be set equal to:
1 if A1 is affine
2 if B1 is affine
3 if B0 is affine
4 if A0 is affine
5 if B2 is affine
0 if no neighbouring block is affine.

When the Merge index of the current block is decoded or parsed the affine flags of the Merge candidates at these positions have already been checked. Consequently, no further memory accesses are needed to derive the context for the Merge index of the current block. This embodiment provides a coding efficiency increase over VTM2.0. No additional memory accesses are required since step 1205 already involves checking the neighbouring CU affine modes.

In a first variant, to limit the number of states, the context variable may be set equal to:
0 if no neighbouring block is affine, or if A1 or B1 is affine to:
1 if B0, A0 or B2 is affine In a second variant, to limit the number of states, the context variable may be set equal
0 if no neighbouring block is affine
1 if A1 or B1 is affine
2 if B0, A0 or B2 is affine In a third variant, the context variable may be set equal to:
1 if A1 is affine
2 if B1 is affine
3 if B0 is affine
4 if A0 or B2 is affine
0 if no neighbouring block is affine.

Please note that these positions are already checked when the merge index is decoded or parsed because the affine flag decoding depends on these positions. Consequently, there is no need for additional memory access to derive the Merge index context which is coded after the affine flag.

Twelfth Embodiment

In the twelfth embodiment signalling the affine mode comprises the affine mode comprises inserting affine mode as a candidate motion predictor.

In one example of the twelfth embodiment, the Affine Merge (and Merge Skip) is signalled as a Merge candidate. In that case the modules 1205, 1206 and 1207 of FIG. 12 are removed. In addition, not to affect the coding efficiency of the Merge mode, the maximum possible number of merge candidates is incremented. For example, in the current VTM version this value is set equal to 6, so with if applying this embodiment to the current version of VTM, the value would be 7.

The advantage is a design simplification of the syntax element of Merge mode because fewer syntax elements need to be decoded. In some circumstances, a coding efficiency can be observed.

Two possibilities to implement this example will now be described:

The Affine Merge index always has the same position inside the list whatever the value of the other Merge MV. The position of a candidate motion predictor indicates its likelihood of being selected and as such if it placed higher up the list (a lower index value), that motion vector predictor is more likely to be selected.

In the first example, the affine Merge index always has the same position inside the list of Merge candidates. This means that it has a fixed Merge idx value. For example this value can be set equal to 5, as the affine merge mode should represent complex motion which is not the most probable content. The additional advantage of this embodiment is that when the current block is parsed (decoding/reading of the syntax element only but not decoding the data itself), the current block can be set as affine block. Consequently the value can be used to determine the CABAC context for the affine flag which is used for AMVP. So the conditional probabilities should be improved for this affine flag and the coding efficiency should be better.

In a second example, the affine Merge candidate is derived with other Merge candidates. In this example, a new affine Merge candidate is added into the list of Merge candidates. FIG. 18 illustrates this example. Compared to FIG. 13, the Affine candidate is the first affine neighbouring block A1, B1, B0, A0 B2 (1917). If the same condition as 1205 of FIG. 12 is valid (1927), the motion vector field produced with the affine parameters is generated to obtain the affine candidate (1929). The list of initial candidates can have 4, 5, 6 or 7 candidates according to the usage of ATMVP, Temporal and Affine candidates.

The order between all these candidate is important as more likely candidates should be processed first to ensure they are more likely to make the cut of motion vector candidates—a preferred ordering is the following:
A1
B1
B0
A0
AFFINE MERGE
ATMVP
B2
TEMPORAL
Combined
Zero_MV It is important to note that the Affine Merge is before the ATMVP mode but after the four main neighbouring blocks. An advantage to set the affine Merge before the ATMVP candidate is a coding efficiency increase, as compared to setting it after the ATMVP and the temporal predictor. This coding efficiency increase depends on the GOP (group of pictures) structure and Quantization Parameter (QP) setting of each picture in the GOP. But for the most use GOP and QP setting this order give a coding efficiency increase.

A further advantage of this solution is a clean design of the Merge and Merge Skip for both syntax and derivation. Moreover, the affine candidate merge index can change according to the availability or value (duplicate check) of previous candidates in the list. Consequently an efficient signalization can be obtained.

In a further example, the affine Merge index is variable according to one or several conditions.

For example, the Merge index or the position inside the list associated with the affine candidate changes according to a criterion. The principle is to set a low value for merge index corresponding to the affine merge when the affine merge has a high probability to be selected (and a higher value when there is low probability to be selected).

In the twelfth embodiment, the affine merge candidate has a merge index value. To improve the coding efficiency of the Merge index it is effective to make the context variable for a bit of the Merge index depend on the affine flags for neighbouring blocks and/or for the current block.

For example, the context variable may be determined using the following formula:

ctxIdx=IsAffine(A1)+IsAffine(B1)+IsAffine(B0)+
   IsAffine(A0)+IsAffine(B2)

The resulting context value may have the value 0, 1, 2, 3 or 4.

The affine flags increase the coding efficiency.

In a first variant, to involve fewer neighbouring blocks, ctxIdx=IsAffine(A1)+IsAffine(B1). The resulting context value may have the value 0, 1, or 2.

In a second variant, also involving fewer neighbouring blocks, ctxIdx=IsAffine(A2)+IsAffine(B3). Again, the resulting context value may have the value 0, 1, or 2.

In a third variant, involving no neighbouring blocks, ctxIdx=IsAffine(current block). The resulting context value may have the value 0 or 1.

FIG. 16 is a flow chart of the partial decoding process of some syntax elements related to the coding mode with the third variant. In this figure the Skip flag (1601), the prediction mode (1611), the Merge flag (1603), the Merge Index (1608) and the affine flag (1606) can be decoded. This flow chart is similar to that of FIG. 12, described hereinbefore, and a detailed description is therefore omitted. The difference is that there is a merge index for the Affine Merge flag, which is not the case in VTM 2.0. In VTM2.0 the Affine flag of the current block cannot be used to obtain a context for the Merge index because it always has the same value '0'.

Thirteenth Embodiment

In the tenth embodiment, the context variable for a bit of the Merge index of the current block depended on the value of the Skip flag for the current block (current Coding Unit, or CU).

In the thirteenth embodiment, instead of using the Skip flag value directly to derive the context variable for the target bit of the Merge index, the context value for the target bit is derived from the context variable for the Skip flag of the current CU. This is possible because the Skip flag is itself CABAC coded and therefore has a context variable.

Preferably, the context variable for the target bit of the Merge index of the current CU is set equal to (copied from) the context variable for the Skip flag of the current CU.

The target bit may be the first bit only. Other bits are bypass coded as in the first embodiment.

The context variable for the Skip flag of the current CU is derived in the manner prescribed in VTM2.0. The advantage of this embodiment compared to the VTM2.0 reference software is a complexity reduction of the merge index decoding and decoder design (and encoder design) without impact on coding efficiency. Indeed, with this embodiment, at the minimum only 1 CABAC state is needed for the Merge index instead of 5 for the current VTM Merge index coding/decoding. Moreover, it reduces the worst-case complexity because the other bits are CABAC bypass coded which reduces the number of operations compared to coding all bits with CABAC.

Fourteenth Embodiment

In the thirteenth embodiment, the context value for the target bit was derived from the context variable for the Skip flag of the current CU.

In the fourteenth embodiment, the context value for the target bit is derived from the context variable for the affine flag of the current CU.

This is possible because the affine flag is itself CABAC coded and therefore has a context variable.

Preferably, the context variable for the target bit of the Merge index of the current CU is set equal to (copied from) the context variable for the affine flag of the current CU.

The target bit may be the first bit only. Other bits are bypass coded as in the first embodiment.

The context variable for the affine flag of the current CU is derived in the manner prescribed in VTM2.0.

The advantage of this embodiment compared to the VTM2.0 reference software is a complexity reduction of the merge index decoding and decoder design (and encoder design) without impact on coding efficiency. Indeed, with this embodiment, at the minimum only 1 CABAC state is needed for the Merge index instead of 5 for the current VTM Merge index coding/decoding. Moreover, it reduces the worst-case complexity because the other bits are CABAC bypass coded which reduces the number of operations compared to coding all bits with CABAC.

Fifteenth Embodiment

In several of the foregoing embodiments, the context variable had more than 2 values, for example the three values 0, 1 and 2. However, to reduce the complexity, and reduce the number of states to be handled, it is possible to cap the number of permitted context-variable values at 2, e.g. 0 and 1. This can be accomplished, for example, by changing any initial context variable having the value 2 to 1. In practice, this simplification has no or only a limited impact on the coding efficiency.

Combinations of Embodiments

Any two or more of the foregoing embodiments may be combined.

The preceding description has focused on the encoding and decoding of the Merge index. For example, the first embodiment involves generating a list of merge candidates including an ATMVP candidate; selecting one of the merge candidates in the list; and generating a merge index for the selected merge candidate using CABAC coding, one or more bits of the merge index being bypass CABAC coded. In principle, the present invention can be applied to modes other than the Merge mode that involve generating a list of motion vector predictor (MVP) candidates; selecting one of the MVP candidates in the list; and generating an index for the selected MVP candidate. Thus, the present invention is not limited to the Merge mode and the index to be encoded or decoded is not limited to the Merge index. For example, in the development of VVC, it is conceivable that the techniques of the foregoing embodiments could be applied to extended to a mode other than the Merge mode, such as the AMVP mode of HEVC or its equivalent mode in VVC. The appended claims are to be interpreted accordingly.

Implementation of Embodiments of the Invention

FIG. 20 is a schematic block diagram of a computing device 2000 for implementation of one or more embodiments of the invention. The computing device 2000 may be a device such as a micro-computer, a workstation or a light portable device. The computing device 2000 comprises a communication bus connected to:—a central processing unit (CPU) 2001, such as a microprocessor; —a random access memory (RAM) 2002 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 2003 for storing computer programs for implementing embodiments of the invention; —a network interface (NET) 2004 is typically connected to a communication network over which digital data to be processed are transmitted or received. The network interface (NET) 2004 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2001; —a user interface (UI) 2005 may be used for receiving inputs from a user or to display information to a user; —a hard disk (HD) 2006 may be provided as a mass storage device; —an Input/Output module (IO) 2007 may be used for receiving/sending data from/to external devices such as a video source or display. The executable code may be stored either in the ROM 2003, on the HD 2006 or on a removable digital medium such as, for example a disk. According to a variant, the executable code of the programs can be received by means of a communication network, via the NET 2004, in order to be stored in one of the storage means of the communication device 2000, such as the HD 2006, before being executed. The CPU 2001 is adapted to control and direct the execution of the instructions or portions of software code of the program or programs according to embodiments of the invention, which instructions are stored in one of the aforementioned storage means. After powering on, the CPU 2001 is capable of executing instructions from main RAM memory 2002 relating to a software application after those instructions have been loaded from the program ROM 2003 or the HD 2006, for example. Such a software application, when executed by the CPU 2001, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 20 and 21.

FIG. 20 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully.

The encoding unit 2108 encodes the image data by using said encoding methods explained in first to fifthteenth embodiments. The encoding unit 2108 uses at least one of encoding methods explained in first to fifthteenth embodiments. For another instance, the encoding unit 2108 can use combination of encoding methods explained in first to fifthteenth embodiments.

The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2118 of the client apparatus 2104 transmits the commands to the network camera 2102.

Further, the communication unit 2118 of the client apparatus 2104 receives the encoded image data from the network camera 2102.

The decoding unit 2116 decodes the encoded image data by using said decoding methods explained in any of the first to fifthteenth embodiments. For another instance, the decoding unit 2116 can use combination of decoding methods explained in the first to fifthteenth embodiments.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2118 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

The network camera system 2100 may determine if the camera 2102 utilizes zoom or pan during the recording of video, and such information may be used when encoding a video stream as zooming or panning during filming may benefit from the use of affine mode which is well-suited to coding complex motion such as zooming, rotating and/or stretching (which may be side-effects of panning, in particular if the lens is a 'fish eye' lens).

FIG. 21 is a diagram illustrating a smart phone 2200.

The smart phone 2200 includes a communication unit 2202, a decoding/encoding unit 2204, a control unit 2206 and a display unit 2208.

the communication unit 2202 receives the encoded image data via network.

The decoding unit 2204 decodes the encoded image data received by the communication unit 2202.

The decoding unit 2204 decodes the encoded image data by using said decoding methods explained in first to fifthteenth embodiments. The decoding unit 2204 can use at least one of decoding methods explained in first to fifteenth embodiments. For another instance, the encoding unit 2202 can use combination of decoding methods explained in first to fifthteenth embodiments.

The control unit 2206 controls other units in the smart phone 2200 in accordance with a user operation or commands received by the communication unit 2202.

For example, the control unit 2206 controls a display apparatus 2208 so as to display an image decoded by the decoding unit 2204.

The smart phone may further comprise an image recording device 2210 (for example a digital camera an associated circuitry) to record images or videos. Such recorded images or videos may be encoded by the decoding/encoding unit 2204 under instruction of the control unit 2206.

The smart phone may further comprise sensors 2212 adapted to sense the orientation of the mobile device. Such sensors could include an accelerometer, gyroscope, compass, global positioning (GPS) unit or similar positional sensors. Such sensors 2212 can determine if the smart phone changes orientation and such information may be used when encoding a video stream as a change in orientation during filming may benefit from the use of affine mode which is well-suited to coding complex motion such as rotations.

ALTERNATIVES AND MODIFICATIONS

It will be appreciated that an object of the present invention is to ensure that affine mode is utilised in a most efficient manner, and certain examples discussed above relate to signalling the use of affine mode in dependence on a perceived likelihood of affine mode being useful. A further example of this may apply to encoders when it is known that complex motion (where an affine transform may be particularly efficient) is being encoded. Examples of such cases include:
a) A camera zooming in/out
b) A portable camera (e.g. a mobile phone) changing orientation during filming (i.e. a rotational movement)
c) A 'fisheye' lens camera panning (e.g. a stretching/distortion of a portion of the image As such, an indication of complex motion may be raised during the recording process so that affine mode may be given a higher likelihood of being used for the slice, sequence of frames or indeed the entire video stream.

In a further example, affine mode may be given a higher likelihood of being used depending on a feature or functionality of the device used to record the video. For example, a mobile device may be more likely to change orientation than (say) a fixed security camera so affine mode may be more appropriate for encoding video from the former. Examples of features or functionality include: the presence/use of zooming means, the presence/use of a positional sensor, the presence/use of panning means, whether or not the device is portable, or a user-selection on the device.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The invention claimed is:

1. A method of encoding a motion vector predictor index, comprising:
    determining a maximum number of motion vector predictor candidates includable in a list of motion vector predictor candidates;
    generating such a list of motion vector predictor candidates having the determined maximum number of motion vector predictor candidates, the list including a candidate for subblock collocated temporal prediction and a candidate for subblock Affine prediction;
    selecting one of the motion vector predictor candidates in the list; and
    encoding a motion vector predictor index for the selected motion vector predictor candidate using CABAC coding, a first bit of the motion vector predictor index being CABAC coded using a single context and all bits, except for the first bit, of the motion vector predictor index being bypass CABAC coded.

2. The method as claimed in claim 1, wherein the motion vector predictor candidates are Merge candidates and the motion vector predictor index is a Merge index.

3. The method as claimed in claim 1, comprising generating an initial list and, if the number of candidates in the initial list is lower than the determined maximum number, adding one or more additional candidates to reach the determined maximum number.

4. The method as claimed in claim 3, wherein the additional candidate(s) is or include a motion vector predictor candidate generated from a combination of other motion vector predictors.

5. The method as claimed in claim 4, wherein the additional candidate(s) is or include a zero motion vector predictor candidate.

6. The method as claimed in claim 5, wherein the or each zero motion vector predictor candidate is added after the motion vector predictor candidate(s) generated from a combination of other motion vector predictors.

7. A method of decoding a motion vector predictor index, comprising:
    determining a maximum number of motion vector predictor candidates includable in a list of motion vector predictor candidates;
    generating such a list of motion vector predictor candidates having the determined maximum number of motion vector predictor candidates, the list including a candidate for subblock collocated temporal prediction and a candidate for subblock Affine prediction;
    decoding the motion vector predictor index using CABAC decoding, a first bit of the motion vector predictor index being CABAC decoded using a single context and all bits, except for the first bit, of the motion vector predictor index being bypass CABAC decoded; and
    identifying one of the motion vector predictor candidates in the list, using the decoded motion vector predictor index.

8. The method as claimed in claim 7, wherein the motion vector predictor candidates are Merge candidates and the motion vector predictor index is a Merge index.

9. The method as claimed in claim 7, comprising generating an initial list and, if the number of candidates in the initial list is lower than the determined maximum number, adding one or more additional candidates to reach the determined maximum number.

10. The method as claimed in claim 9, wherein the additional candidate(s) is or include a motion vector predictor candidate generated from a combination of other motion vector predictors.

11. The method as claimed in claim 10, wherein the additional candidate(s) is or include a zero motion vector predictor candidate.

12. The method as claimed in claim 11, wherein the or each zero motion vector predictor candidate is added after the motion vector predictor candidate(s) generated from a combination of other motion vector predictors.

13. The method as claimed in claim 7, wherein in the subblock collocated temporal prediction a current block in a current image is capable of being predicted from a collocated reference block in a reference image, the current block and the reference block each having a plurality of subblocks, and the subblock collocated temporal prediction comprises using motion information of each subblock of the reference block.

14. The method as claimed in claim 13, wherein the reference block comprises four subblocks and motion information of each subblock of the reference block is used in the subblock collocated temporal prediction.

15. The method as claimed in claim 7, wherein the subblock Affine prediction comprises using a first control point vector of a first control point and a second control point vector of a second control point to derive motion information for each subblock within a current block in a current image.

16. An encoding apparatus for encoding a motion vector predictor index, comprising:
    a determiner which determines a maximum number of motion vector predictor candidates includable in a list of motion vector predictor candidates;
    a generator which generates such a list of motion vector predictor candidates having the determined maximum number of motion vector predictor candidates, the list including a candidate for subblock collocated temporal prediction and a candidate for subblock Affine prediction;
a selector which selects one of the motion vector predictor candidates in the list; and
an encoder which encodes a motion vector predictor index for the selected motion vector predictor candidate using CABAC coding, a first bit of the motion vector predictor index being CABAC coded using a single context and all bits, except for the first bit, of the motion vector predictor index being bypass CABAC coded.

17. A decoding apparatus for decoding a motion vector predictor index, comprising:
a determiner which determines a maximum number of motion vector predictor candidates includable in a list of motion vector predictor candidates;
a generator which generates such a list of motion vector predictor candidates having the determined maximum number of motion vector predictor candidates, the list including a candidate for subblock collocated temporal prediction and a candidate for subblock Affine prediction;
a decoder which decodes the motion vector predictor index using CABAC decoding, a first bit of the motion vector predictor index being CABAC decoded using a single context and all bits, except for the first bit, of the motion vector predictor index being bypass CABAC decoded; and
an identifying unit which identifies one of the motion vector predictor candidates in the list, using the decoded motion vector predictor index.

18. A non-transitory computer-readable storage medium carrying a computer program comprising program instructions adapted to perform, when executed in a computing device, a method of encoding a motion vector predictor index, comprising:
determining a maximum number of motion vector predictor candidates includable in a list of motion vector predictor candidates;
generating such a list of motion vector predictor candidates having the determined maximum number of motion vector predictor candidates, the list including a candidate for subblock collocated temporal prediction and a candidate for subblock Affine prediction;
selecting one of the motion vector predictor candidates in the list; and
encoding a motion vector predictor index for the selected motion vector predictor candidate using CABAC coding, a first bit of the motion vector predictor index being CABAC coded using a single context and all bits, except for the first bit, of the motion vector predictor index being bypass CABAC coded.

19. A non-transitory computer-readable storage medium carrying a computer program comprising program instructions adapted to perform, when executed in a computing device, a method of decoding a motion vector predictor index, comprising:
determining a maximum number of motion vector predictor candidates includable in a list of motion vector predictor candidates;
generating such a list of motion vector predictor candidates having the determined maximum number of motion vector predictor candidates, the list including a candidate for subblock collocated temporal prediction and a candidate for subblock Affine prediction;
decoding the motion vector predictor index using CABAC decoding, a first bit of the motion vector predictor index being CABAC coded using a single context and all bits, except for the first bit, of the motion vector predictor index being bypass CABAC decoded; and
identifying one of the motion vector predictor candidates in the list, using the decoded motion vector predictor index.

20. The decoding apparatus as claimed in claim 17, wherein in the subblock collocated temporal prediction a current block in a current image is capable of being predicted from a collocated reference block in a reference image, the current block and the reference block each having a plurality of subblocks, and the subblock collocated temporal prediction comprises using motion information of each subblock of the reference block.

21. The decoding apparatus as claimed in claim 20, wherein the reference block comprises four subblocks and motion information of each subblock of the reference block is used in the subblock collocated temporal prediction.

22. The decoding apparatus as claimed in claim 17, wherein the subblock Affine prediction comprises using a first control point vector of a first control point and a second control point vector of a second control point to derive motion information for each subblock within a current block in a current image.

* * * * *